United States Patent
Ebbers et al.

(10) Patent No.: US 9,795,149 B2
(45) Date of Patent: Oct. 24, 2017

(54) POSITIONING DEVICE FOR POSITIONING POULTRY LEGS CONVEYED IN SINGLE FILE IN THE CONVEYING DIRECTION ALONG A CONVEYOR SECTION AND THE METHOD COMPRISING SAID POSITIONING FOR REMOVING THE THIGH MEAT FROM POULTRY LEGS

(71) Applicant: LINCO FOOD SYSTEMS A/S, Trige (DK)

(72) Inventors: Hermanus Godefridus Wilhelmus Ebbers, Angerlo (NL); Wilhelmus Henricus Berendina Giezen, Wehl (NL)

(73) Assignee: Linco Food Systems A/S, Trige (DK)

( * ) Notice: Subject to any disclaimer, the term of this patent is extended or adjusted under 35 U.S.C. 154(b) by 0 days.

(21) Appl. No.: 15/116,490

(22) PCT Filed: Feb. 7, 2014

(86) PCT No.: PCT/EP2014/052465
§ 371 (c)(1),
(2) Date: Aug. 3, 2016

(87) PCT Pub. No.: WO2015/117668
PCT Pub. Date: Aug. 13, 2015

(65) Prior Publication Data
US 2017/0006883 A1    Jan. 12, 2017

(51) Int. Cl.
A22C 21/00    (2006.01)
A22C 17/00    (2006.01)

(52) U.S. Cl.
CPC ...... *A22C 21/0076* (2013.01); *A22C 17/0006* (2013.01); *A22C 21/0023* (2013.01); *A22C 21/0053* (2013.01)

(58) Field of Classification Search
CPC .............. A22C 17/004; A22C 21/0023; A22C 21/0069; A22C 21/0076
(Continued)

(56) References Cited

U.S. PATENT DOCUMENTS 5,173,077 A    12/1992   van den Nieuwelaar et al.
5,401,210 A *  3/1995   Manmoto .......... A22C 21/0076
                                                    452/127

(Continued)

FOREIGN PATENT DOCUMENTS

CN    202340715 U    7/2012
CN    102711488 A    10/2012
(Continued)

OTHER PUBLICATIONS

International Preliminary Report on Patentablity dated Aug. 9, 2016 from International Patent Application No. PCT/EP2014/052465 filed Feb. 7, 2014.
(Continued)

*Primary Examiner* — Richard Price, Jr.
(74) *Attorney, Agent, or Firm* — Sunstone IP

(57) ABSTRACT

A positioning apparatus for positioning poultry legs which are conveyed suspended in a row has a bending device for bending and positioning the poultry legs, as well as a stationary holding and guiding device. The bending device forms a threading device for suspending the poultry leg in the region of the knee joint in a holding and guiding gap of the holding and guiding device. Co-running positioning elements are formed by driven pressing elements which grip the poultry leg from beneath on an axial side of the leg for bending and lifting. Each co-running positioning element forms with a stationary positioning element a functional pair of positioning elements. One of the two positioning elements engages in the hollow of the knee of the poultry leg, (Continued)

while the other positioning element is configured to rest against the thigh on the front side of the leg. Processing stations can be arranged along the holding and guiding gap. In a method for removing the thigh meat from the poultry legs conveyed in a row while they are being conveyed, the poultry legs are guided transversely in a first mentioned positioning apparatus with the lateral side of the leg leading and axially in a second mentioned positioning apparatus with the axial patella side of the leg leading. Along the first stationary holding and guiding gap, cuts are applied on the front side of the leg and on the rear side of the leg. Along the second stationary holding and guiding gap, cuts are applied on the lateral sides of the poultry leg and the thigh meat is pushed to the proximal end of the thigh bone.

46 Claims, 19 Drawing Sheets

(58) Field of Classification Search
USPC .................................................. 452/135–138
See application file for complete search history.

(56) References Cited

U.S. PATENT DOCUMENTS

| | | | | |
|---|---|---|---|---|
| 5,462,477 | A * | 10/1995 | Ketels | A22C 17/004 269/22 |
| 5,542,879 | A * | 8/1996 | Kunig | A22C 21/0076 452/135 |
| 5,713,787 | A * | 2/1998 | Schoenmakers | A22C 17/004 452/136 |
| 5,810,653 | A * | 9/1998 | Van Craaikamp | A22C 21/0076 452/136 |
| 5,890,956 | A | 4/1999 | Habenicht et al. | |
| 5,947,811 | A | 9/1999 | Hazenbroek | |
| 5,961,383 | A * | 10/1999 | Janssen | A22C 21/0076 452/135 |
| 5,976,004 | A * | 11/1999 | Hazenbroek | A22C 21/0084 452/136 |
| 7,059,954 | B2 | 6/2006 | Annema et al. | |
| 7,232,365 | B2 * | 6/2007 | Annema | A22C 21/0084 452/167 |
| 8,900,039 | B2 * | 12/2014 | Drabbels | A22C 21/06 452/116 |
| 2002/0090903 | A1 | 7/2002 | Annema et al. | |
| 2003/0181157 | A1 | 9/2003 | Annema et al. | |
| 2005/0059333 | A1 | 3/2005 | Annema et al. | |
| 2005/0059334 | A1 | 3/2005 | Haley | |
| 2008/0064315 | A1 | 3/2008 | Annema et al. | |

FOREIGN PATENT DOCUMENTS

| | | |
|---|---|---|
| DE | 69100902 T2 | 5/1994 |
| DE | 60013263 T2 | 1/2005 |
| EP | 0858740 A1 | 2/1997 |
| EP | 1430780 A1 | 6/2004 |
| EP | 1956919 | 8/2008 |
| EP | 2329721 A1 | 6/2011 |
| EP | 2389812 A2 | 11/2011 |

OTHER PUBLICATIONS

International Search Report dated Oct. 22, 2014 from International Patent Application No. PCT/EP2014/052465 filed Feb. 7, 2014.

* cited by examiner

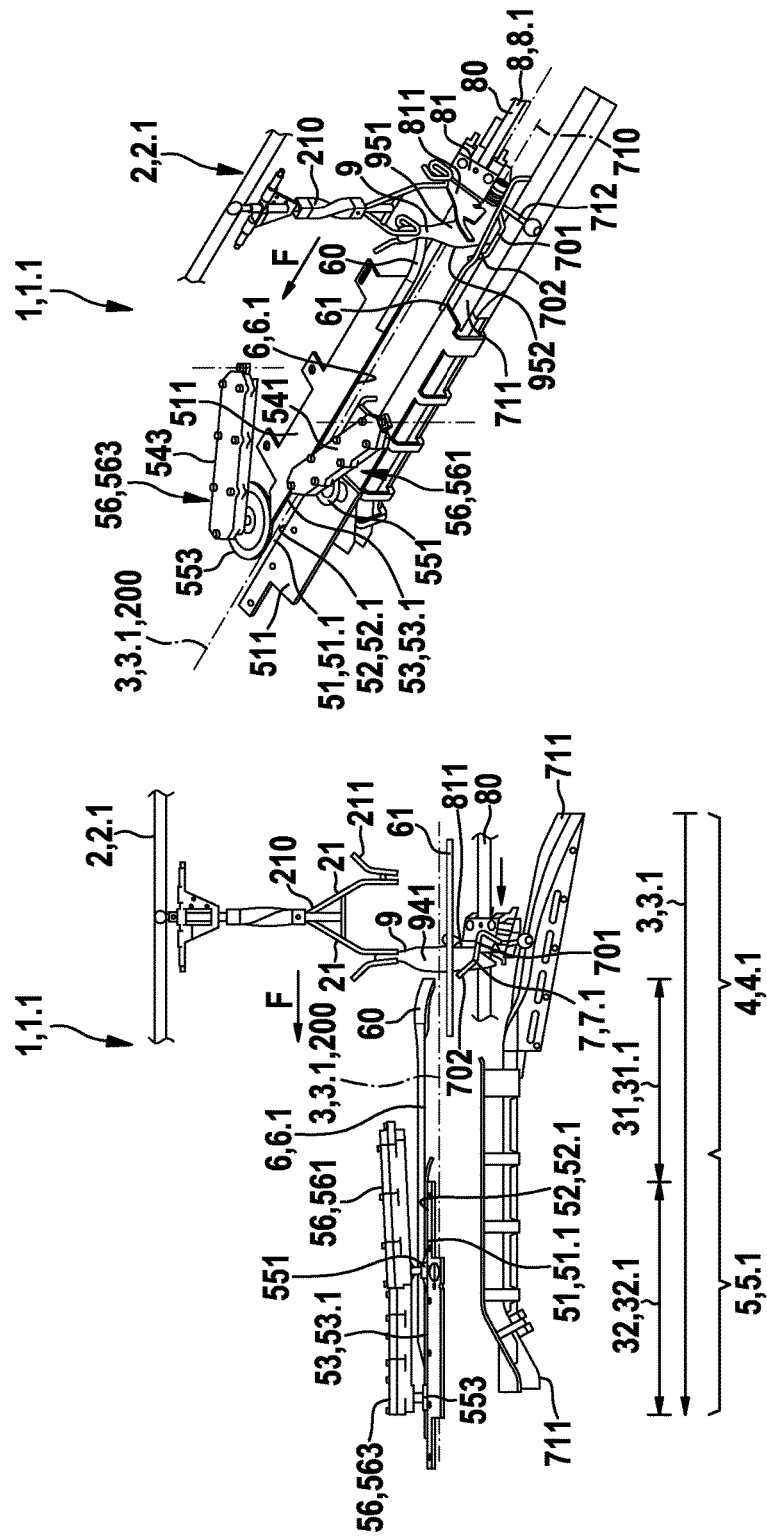

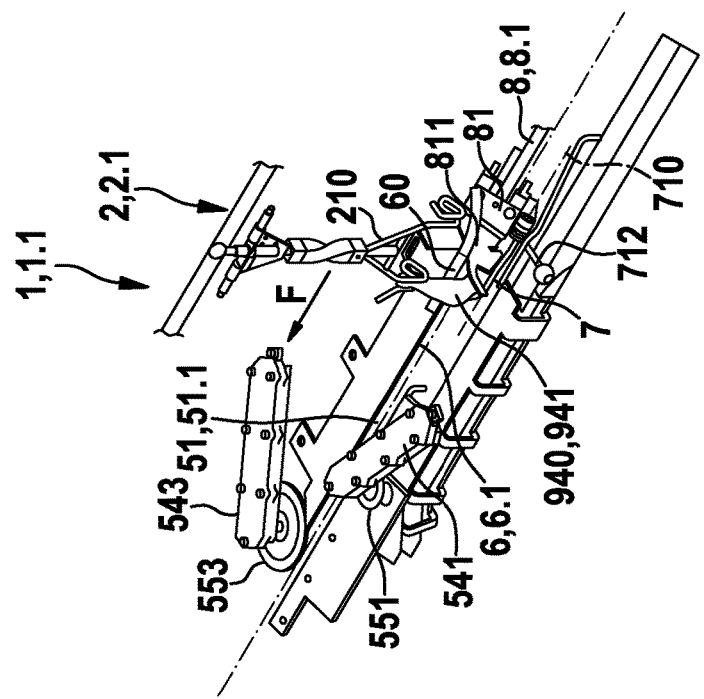
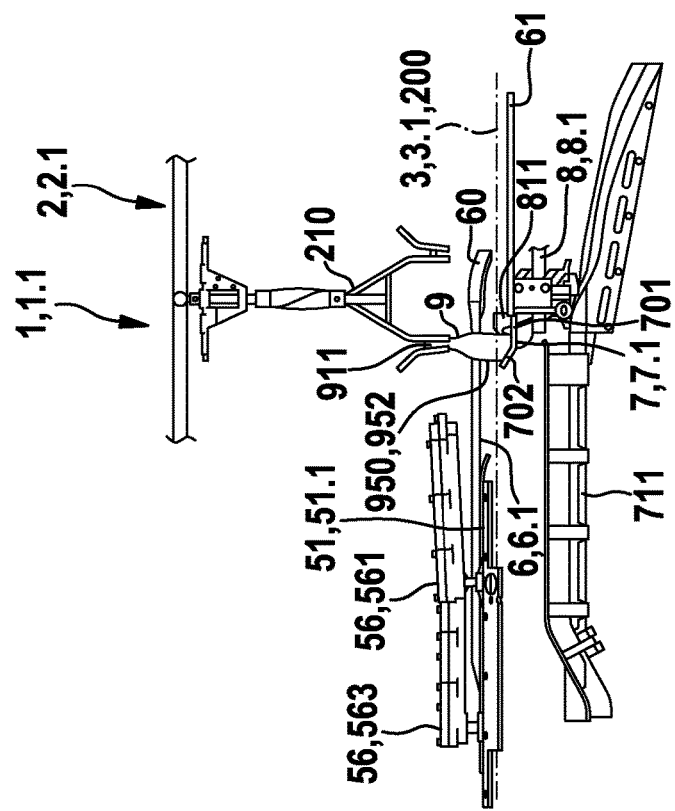
Fig. 2B
Fig. 2A

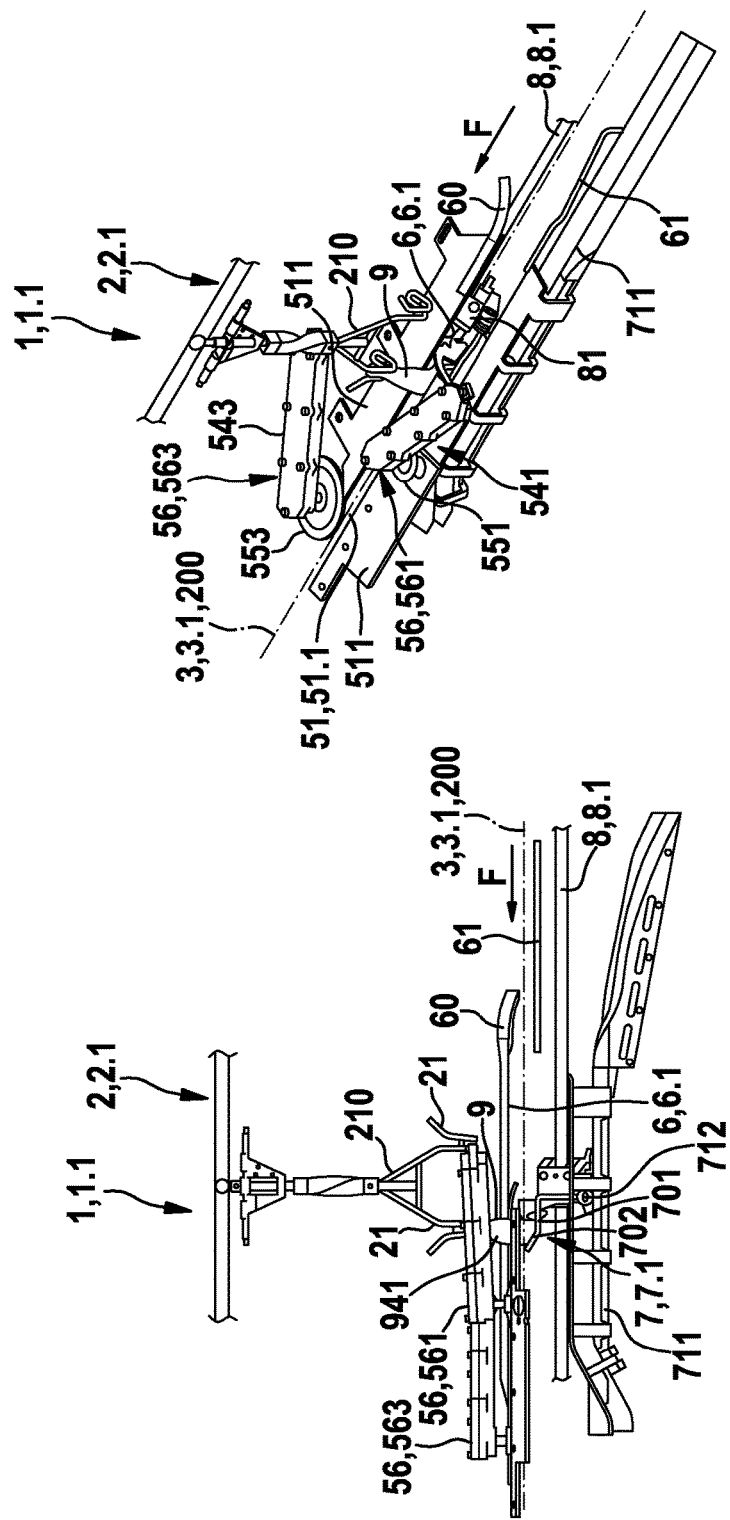

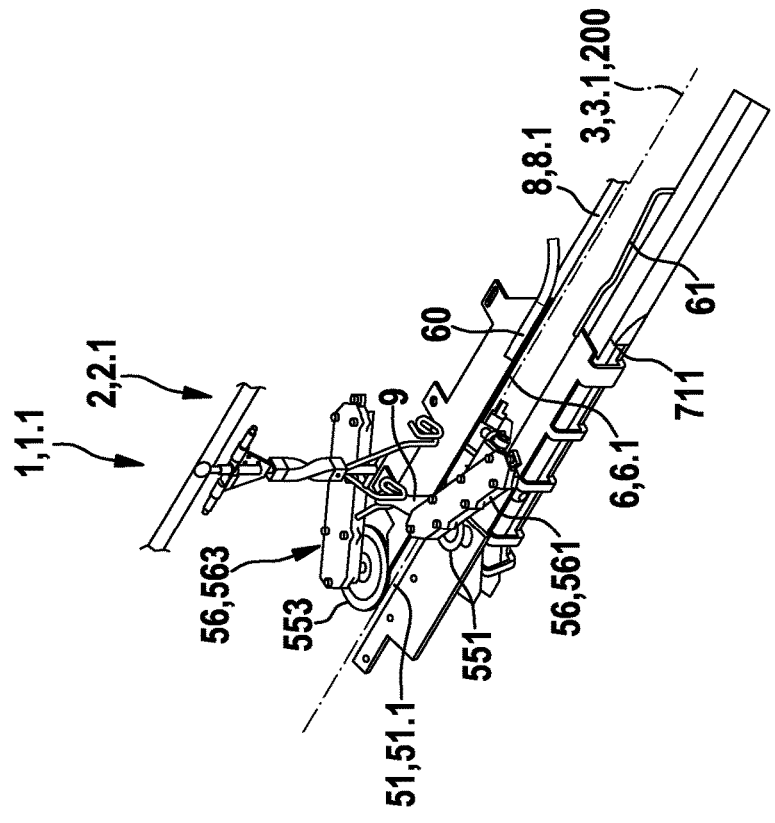
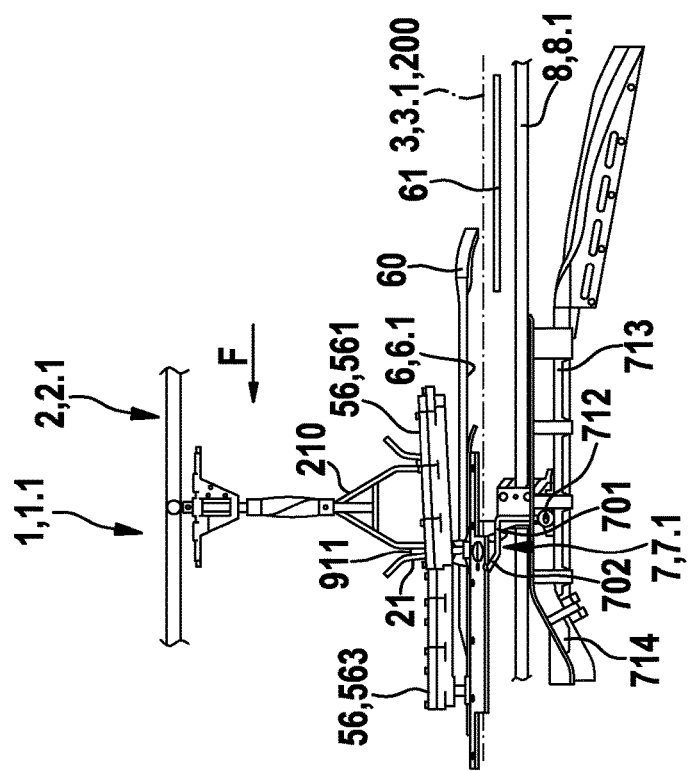
Fig. 4A
Fig. 4B

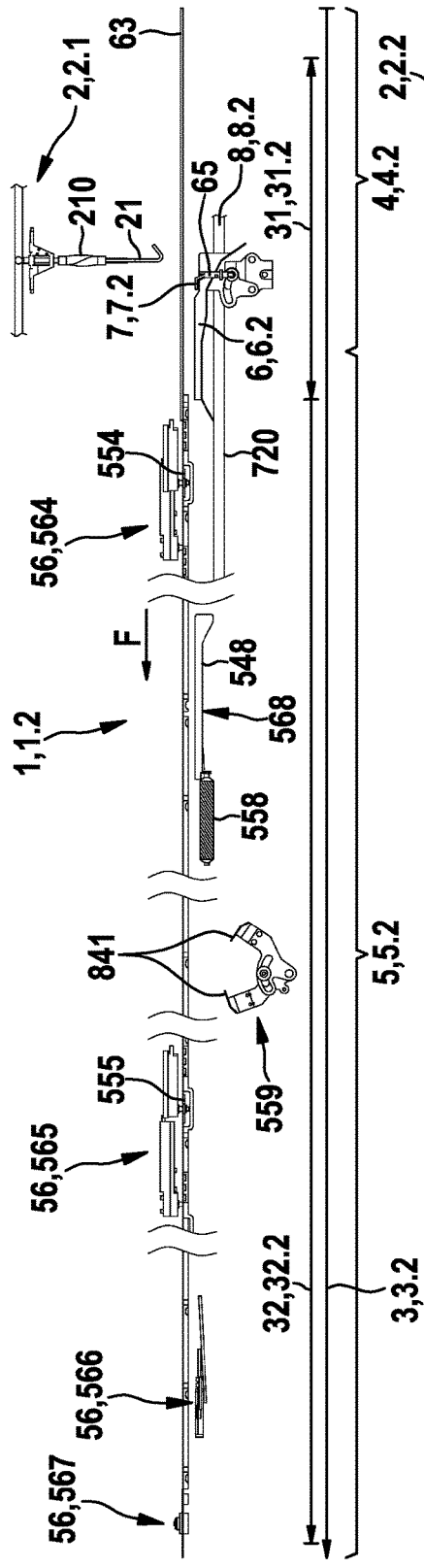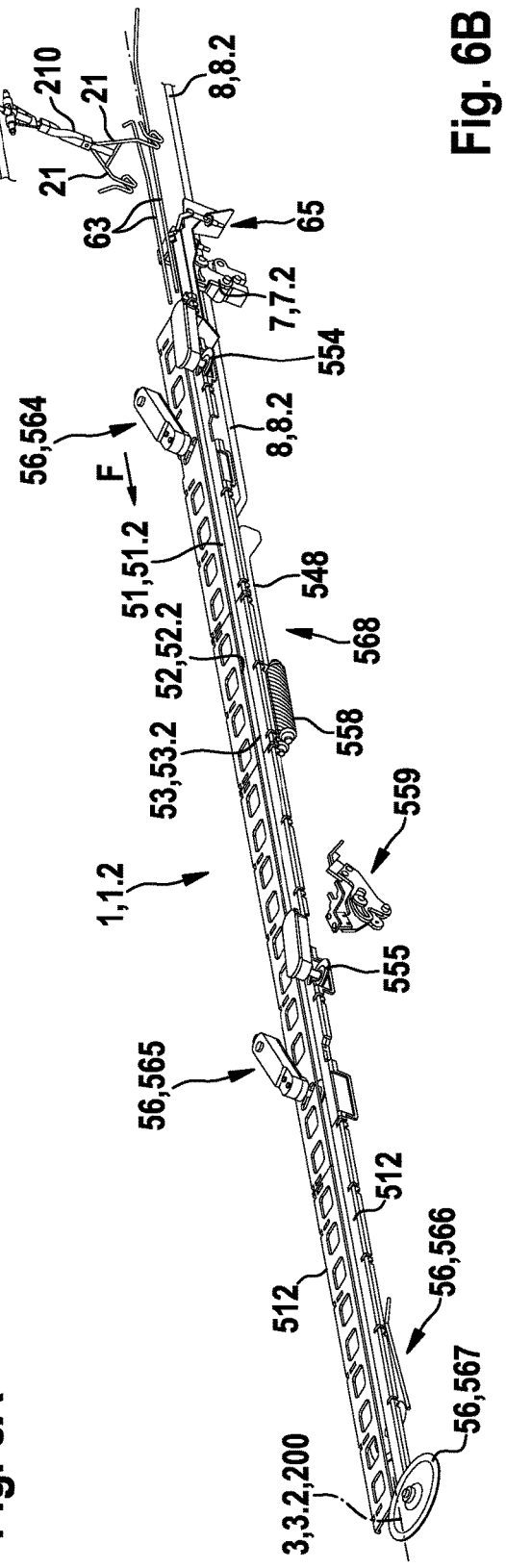

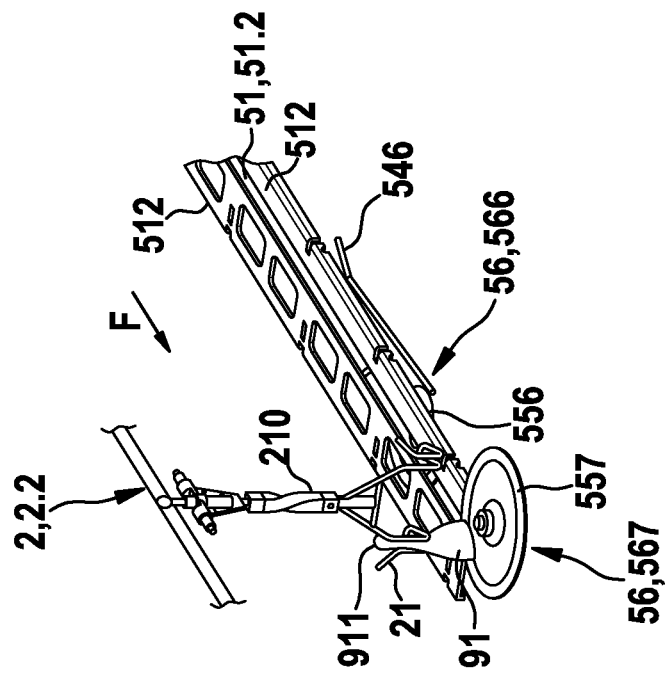
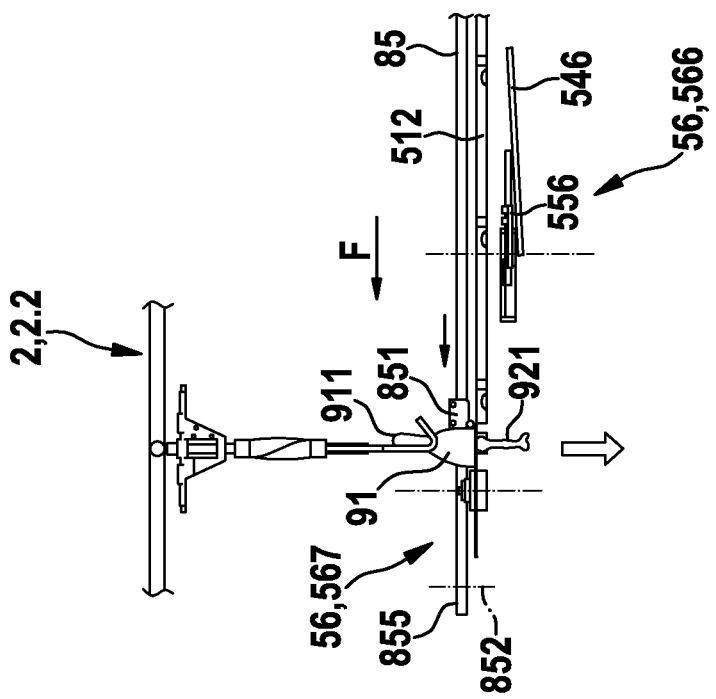
Fig. 17B
Fig. 17A

US 9,795,149 B2

POSITIONING DEVICE FOR POSITIONING POULTRY LEGS CONVEYED IN SINGLE FILE IN THE CONVEYING DIRECTION ALONG A CONVEYOR SECTION AND THE METHOD COMPRISING SAID POSITIONING FOR REMOVING THE THIGH MEAT FROM POULTRY LEGS

CROSS REFERENCE TO RELATED APPLICATION(S)

This application is a U.S. National Stage Entry of International Patent Application No. PCT/EP2014/052465, filed Feb. 7, 2014.

BACKGROUND

Technical Field

The invention relates to a positioning apparatus for positioning poultry legs conveyed in a row in a direction of conveyance along a conveying way in a processing position which represents a reference position for processing of the poultry legs, wherein the drumstick and the thigh of the poultry legs are connected to one another by the knee joint and wherein one axial side of the leg, on which the patella is located, determines the front side of the leg, and the other axial side of the leg, on which the hollow of the knee is located, determines the rear side of the leg, comprising
  a conveyor device having carriers which are movable along the conveying way in the direction of conveyance and which convey and hold the poultry legs, each with an ankle joint ball held in an associated mentioned carrier, along the entire conveying way of the positioning apparatus, wherein the carriers hold the poultry legs in a suspended position while they are fed into the positioning device,
  a bending device having a stationary positioning element extending in a bending conveying section of the conveying way, and a series of co-running positioning elements which each co-run in the direction of conveyance in association with an associated mentioned carrier, wherein a co-running positioning element forms with the stationary positioning element a pair of positioning elements, of which a first positioning element is configured to engage in the hollow of the knee of the poultry leg and a second positioning element is configured to rest against the thigh on the front side of the leg, and wherein in the bending conveying section of the conveying way, the first positioning element and the second positioning element in the pair produce and determine between them a bending angle which corresponds to the angle of the hollow of the knee and which becomes smaller while lifting the poultry leg from the initial suspended position until the mentioned reference position is reached, and results in corresponding bent positions of the poultry leg, wherein the carriers of the conveyor device are so configured that the ankle joint ball in the carrier is able to move in a manner corresponding to the lifting of the poultry leg, and
  a reference holding edge extending in the conveying way, on which the poultry leg is held in a defined lifted position, namely in the reference position, in the region of the knee joint.

The invention relates also to a method for removing, during conveying, the thigh meat from poultry legs conveyed in a row in the direction of conveyance, wherein the poultry leg is positioned by a positioning apparatus by defined lifting and holding of the knee joint, cuts are applied in the poultry leg meat in the region of the knee of the poultry leg down to the bone, and the thigh meat is pushed from the specifically positioned knee joint to the hip joint bone. The drumsticks and thighs of the poultry legs are connected to one another by the knee joint, and the poultry legs are in a suspended arrangement with the ankle joint balls held in a carrying device.

The poultry legs that are positioned are legs which have been separated from a poultry carcass and consist of the thigh and the drumstick.

State of the Art

A device for processing the legs of poultry is known from EP 0 858 740 A1. The device is equipped with a positioning apparatus of the generic type. The bending device therein has a revolving support plate with recesses, in each of which a poultry leg comes to lie in the region of the knee joint, namely between a fixed (stationary) guide rail and a supporting edge which co-runs with the recesses, which forms a positioning element in each recess. The known device requires a circular or carousel-like guide, the support plate being provided on its lower side with orientation means for orienting the thighs substantially radially in relation to the axis of revolution of the support plate. The bending angle of the poultry leg is made smaller by the guide rail, and the poultry leg is lifted for positioning of the supporting edge in the hollow of the knee. Although a cutting point on the knee joint of the poultry leg is reached independently of certain differences in length of the drumstick, cutting can be carried out only with a single cutting means, whereby the poultry leg has to be brought into the special bent position with the radial orientation of the thigh.

An apparatus having a linear conveying way for removing the thighs from poultry legs is known from DE 691 00 902 T2. The poultry legs are suspended by their tarsal joints and positioned by a leg positioning device. This has positioning blocks co-running in a straight direction of conveyance, which cooperate, in the region in which the poultry leg is cut, with a guide strip, which in turn cooperates with a separating device for executing the cut.

DE 600 13 263 T2 (FIGS. 21 to 28) discloses a device in which poultry legs are positioned in a space between a carrier block and a cutting block, wherein a carrying edge is arranged beneath the patella and moves upwards in order to position the knee joint in relation to a cutting blade arranged on each cutting block. Instead of the knee carrier block, an arm can be provided for positioning the patella.

A method of the generic type is known from DE 691 00 902 (FIGS. 4 to 12). A cylindrical control element of a carousel device has a plurality of scraping units. In each scraping unit, which is equipped with two scraping elements, thigh meat is scraped from the thigh bone of a poultry leg which is suspended by its tarsal joint on a rotating suspension plate. In the scraping unit, the poultry leg is bent approximately at a right angle and brought by one of the scraping elements into a reproducible position in which an incision is made at the back of the knee. With the knee joint in an extended position effected by the two scraping elements, an incision is made below the patella. With the aid of a positioning stop, the incision is always made at the same point of the knee joint, and cutting of the patella is prevented. The two scraping elements of the scraping unit are moved towards the hip joint in order to scrape off the thigh meat. In the scraping unit, the thigh meat can be cut away from the thigh bone. The mentioned cuts are made in each scraping unit while the poultry leg is conveyed in its suspended position by the suspension plate. The legs from which the thigh meat has been removed are transferred to a straight conveying way, on which the thigh bone is cut.

It is characteristic of the known apparatuses that the poultry leg, during cutting in the region of the knee joint, is to be positioned and held in an associated specific bent position, the positioning effected during cutting by defined bending of the poultry leg being eliminated when a cut at the knee joint is complete. Such positioning is considered to be particularly suitable for a circular guide or carousel transport. Circular guides or carousel devices impair the conveying speed, and the adaptation of conveying paths to desired spatial regions is made more difficult. Carrying out and maintaining the positioning of the poultry leg knee joint in a specific bent position associated with the position of the cutting means limit considerably the processing possibilities as a result of the cut, which is to be applied along the conveying way at the position of the associated bend with a specially adapted cutting tool. The application of the cut and/or the variety of cuts are impaired.

SUMMARY

The objects underlying the invention are to improve the processing and positioning of the poultry legs conveyed in a row along a space-saving conveying way. In particular for the removal of the thigh meat from poultry legs, the optimum application of cuts is to be achieved by the positioning measures according to the invention. Differences in the lengths of the poultry legs are to be countered. In any case, it is to be possible to carry out cuts and further processing at desired processing points which are separate from one another in a particularly reliable and precise manner. In particular, the cuts are to be made at a point separate from dynamic positioning. Advantages of guiding in a straight conveying line are to be utilised to a particular degree in respect of high speed and space-saving incorporation into a processing plant.

The objects according to the invention are achieved in connection with the features of the positioning apparatus mentioned hereinbefore in that the positioning apparatus has a stationary holding and guiding device downstream of the bending conveying section in the direction of conveyance, which holding and guiding device holds each poultry leg in the reference position ready for processing as the poultry leg is conveyed along a processing conveying section of the conveying way, wherein the holding and guiding device is equipped over the length of the processing conveying section with a stationary holding and guiding gap extending in the conveying way and having stationary gap edges which receive the poultry leg in the region of the knee joint for holding and guiding in the reference position, and wherein the mentioned reference holding edge forms at least in part a mentioned stationary gap edge, that the bending conveying section and the processing conveying section are linear, that the mentioned bending device forms a threading device for threading the poultry leg in the region of the knee joint into the holding and guiding gap, wherein the co-running positioning elements are formed by driven pressing elements, and a drive and control device is provided, which moves each driven pressing element in the direction of conveyance and, for bending, in two dimensions in the lifting direction and transversely thereto in a direction in which the driven pressing element grips the poultry leg from beneath on one of the mentioned axial sides of the leg.

The objects are achieved in connection with the features of the method mentioned hereinbefore in that the poultry legs are conveyed in a straight direction of conveyance while all manipulations for positioning and processing are performed automatically, wherein the poultry legs are conveyed by carriers which can be moved along a straight conveying way and in which the poultry legs, each associated with a carrier, are held by the ankle joint ball during the entire conveying operation, that the poultry legs are conveyed by a straight conveying way in two conveying sections, namely in a first conveying section (lateral conveying section) in which the poultry legs are conveyed transversely with the lateral side of the leg leading and, after rotation of each carrier about a vertical axis, in a second conveying section (axial conveying section) in which the poultry legs are conveyed axially with the axial side of the leg, on which the patella is located, leading, namely in an axial plane common to the axes of the thigh bone and of the drumstick bone, with the patella leading, that in the first conveying section, the poultry legs conveyed transversely therein are introduced for positioning into a first stationary holding and guiding gap (lateral holding and guiding gap) which extends linearly in the direction of conveyance and has first stationary gap edges (lateral gap edges), wherein the transversely conveyed poultry leg is suspended in the first stationary holding and guiding gap at a defined point of an axial knee joint bony prominence by that bony prominence and thereby lifted into a defined reference position for the performance of processing operations along the first (lateral) gap conveying way of the first holding and guiding gap and is moved in the direction of conveyance by sliding at the height of the knee joint on the gap edges, wherein the ankle joint ball, for lifting the poultry leg, is held in a movable manner in the carrier holding the poultry leg, that in the first gap conveying way of the first stationary holding and guiding gap, a first front-side leg cut is applied on the front side of the leg at the height of the knee joint with a cutting depth to the cartilage (first front-side leg cut) and a rear-side leg cut is applied on the rear side of the leg at the height of the knee joint with a cutting depth to the knee joint bone, that in the second conveying section, the poultry legs conveyed axially therein are introduced for positioning into a second stationary holding and guiding gap (axial holding and guiding gap) which extends linearly in the direction of conveyance and has two stationary gap edges (axial gap edges), wherein the axially conveyed poultry leg is suspended in the second stationary holding and guiding gap at a defined point of a lateral knee joint bony prominence by that bony prominence and thereby lifted into a defined reference position for the performance of processing operations along the second gap conveying way of the second holding and guiding gap and is moved in the direction of conveyance by sliding at the height of the knee joint on the gap edges, wherein the ankle joint ball, for lifting the poultry leg, is held in a movable manner in the carrier holding the poultry leg, and that in the second gap conveying way of the second stationary holding and guiding gap, a pair of first lateral cuts are applied on the lateral sides of the poultry leg at the height of the knee joint with a cutting depth to the cartilage of the bone and then a pair of second lateral cuts are applied on the lateral sides of the poultry leg below the knee joint with a cutting depth to the thigh bone, and the thigh meat is pushed onto the hip joint bone at the proximal end of the thigh bone.

A number of advantages are achieved with the measures according to the invention.

In the bending conveying section, the poultry leg is conveyed and bent at the knee. In any case, the stationary holding and guiding device arranged downstream of the bending conveying section according to the invention is formed along the linear conveying way by the stationary holding and guiding gap. It is ensured that the poultry leg assumes the reference position along the conveying way before, at and after a or each processing point. Along the sliding stretch of the holding and guiding gap, static (maintained) positioning of the knee joint established with at least one reference position takes place, in contrast to the dynamic (changing, volatile) positioning of the knee joint along the bending conveying section. The reference positioning is independent of a processing point, for example the site of application of a cutting tool, and of the orientation of the poultry leg. This means that the poultry leg, for example, can be in a largely extended or less extended or bent position, while the poultry leg is suspended, defined by the knee joint, in the holding and guiding gap. The holding and guiding gap extends at least substantially linearly and can advantageously be formed by a gap or slot between two guide plates, guide strips or the like.

The gap width is at least substantially the same along the conveying way. This is understood as meaning that the gap width is the same at least in one section or also converges in the direction of conveyance to a particular degree at least in one section, in particular an entry section. In any case, the gap width over the entire gap length is such that the knee joint is suspended in the reference position in the holding and guiding gap and is thereby suspended in a defined manner at at least one gap edge.

The suspension of the non-defleshed poultry leg by the holding and guiding gap is additionally such that the poultry leg slides along the holding and guiding gap or on the edges thereof. In particular, the holding and guiding gap can be arranged horizontally, namely at the same height in relation to the row of conveying carriers or in relation to the axial dimension of the poultry legs. In relation to the axial height of the poultry legs, the holding and guiding gap can also extend, to a certain degree, in an inclined or curved manner relative to the length of the poultry legs. The mentioned linear extent is understood as meaning that the poultry joints in any case continue to be conveyed in a vertical plane, that is to say the course of the gap extends, if at all, slightly downwards or upwards but not laterally or horizontally transversely to those directions.

In any case, the poultry leg is held at a defined reference height during transport to the end of the holding and guiding gap. The or each defined height of the knee joint along the holding and guiding gap, which in particular is retained at the same height, ensures a or each defined reference position of the poultry leg in at least one and in particular one row of processing points along the holding and guiding gap. The holding and guiding gap, or the edges thereof, as such do not form part of a processing tool, or are free of processing elements. The linear sliding transport of the poultry leg in the reference position, which is established and retained during sliding in the holding and guiding gap, ensures a relatively high conveying speed, whereby the poultry leg can advantageously be processed precisely during transport at a plurality of processing points arranged in a row along the holding and guiding gap. The reference positioning is thereby retained irrespective of whether the poultry leg is additionally acted upon above and/or below the holding and guiding gap by orienting, bearing or supporting elements that convey, orient or bend the poultry leg, namely, for example, by slide elements and/or counter-bearing elements co-running in the direction of conveyance, which engage the poultry leg downstream or upstream. In any case, conveying during the linear reference transport is by the carriers of the conveyor device which are moved correspondingly linearly.

The suspension of the poultry leg on the associated carrier is such that, although the ankle joint ball (tarsal joint) remains in engagement with the carrier along the holding and guiding gap for transport, the ankle joint ball is held in such a manner that the ankle joint ball is substantially freely movable in the height or axial direction of the poultry leg for giving way. In particular, the carriers can be formed by clamps which are open at the top, in which the ankle joint ball is caught and lifted when the poultry leg is lifted.

By the holding and guiding gap, the poultry legs are conveyed in the linear direction of conveyance during all the manipulations performed automatically for processing. Each manipulation can be performed, for consistent processing of all the poultry legs, by the same manipulation device associated with a manipulation.

The bending device provided in front of the holding and guiding gap and arranged upstream in the conveying way in relation thereto threads the knee joint of the poultry leg in the region of the knee joint into the holding and guiding gap. The operation of threading is combined with special measures according to the invention of bending the poultry leg. The special discrete co-running positioning elements are important on the one hand. They are driven pressing elements, namely elements that are movable in a plurality of directions by at least one active, independent drive. The mentioned two-dimensional movement in the lifting direction and also transversely to the lifting direction takes place in the axial plane in which the axes of the thigh bone and of the drumstick bone of a poultry leg in any case substantially extend. Moreover, the driven pressing element is moved concurrently in the direction of conveyance. By the lifting/transverse movements in the axial plane, the poultry leg is in particular increasingly offset or displaced during positioning bending, which takes place during transport in the direction of conveyance.

The drive and control device moving and guiding the co-running positioning element can be formed by a device which moves the co-running positioning element, for example, by a strand-type drive, for example with a belt, band or chain, or by the same device in conjunction with a control curve which is produced, for example, by a mechanical guiding and cam device. It is important that the co-running positioning element is moved in the mentioned axial plane of the poultry leg bones by movement components which are preferably increasing, that is to say progressive.

The co-running positioning element operates, forming a functional pair, in cooperation with the stationary positioning element. The stationary positioning element extends in the bending conveying section along the conveying way. The stationary positioning element, in contrast to each co-running positioning element, is bound to a fixed location or location region. The stationary positioning element is, for example, fixed to a frame or framework of the positioning apparatus. However, stationary arrangement is also understood as meaning that the stationary positioning element can be movable in a local region, insofar as limited locally thereto, in directions in the mentioned axial plane of the poultry leg bones, for example resiliently or in this respect also by a drive, always in such a manner that bending of the poultry leg is effected between on the one hand the stationary positioning element and on the other hand each co-running positioning element. For example, it is conceivable that the stationary positioning element is lifted transversely to the direction of conveyance in a section of the bending conveying section. A movement of the stationary element against the movement executed by the co-running positioning element for bending also comes into consideration. The stationary positioning element can optionally yield against in particular resilient force, as long as the bending action is achieved in cooperation with the co-running positioning element moved in two dimensions in the axial plane of the poultry leg bones.

According to the invention, the bending device is so configured that each poultry leg conveyed in a row is suspended in the holding and guiding gap by its knee joint in a precise position at the beginning of the holding and guiding gap and is consequently threaded into the gap. The width of the holding and guiding gap can be adapted to the knee joint bony prominence on the one hand of an axially conveyed poultry leg and on the other hand of a laterally conveyed poultry leg. Axial conveying and lateral conveying will be described in greater detail below. Threading according to the invention in a defined height position is made possible because the poultry leg—starting from a more or less extended orientation, which is effected by suspending the poultry leg by the ankle joint—is brought into an increasingly bent position. Bending is accompanied by lifting of the poultry leg, the knee joint being at a lower height than the holding and guiding gap during lifting. Lateral conveying of the poultry legs takes place in particular along the mentioned converging holding and guiding gap. The holding and guiding gap with the same width, on the other hand, is particularly suitable for axial conveying.

The poultry legs are accessible for processing without any special orientation requirements and they can be positioned with desired different orientations. Processing can advantageously take place at a plurality of processing points which can be configured and set up according to the processing requirement.

According to the form of the invention relating to the method, the poultry legs are conveyed along two linear conveying ways, which are preferably oriented together in a straight conveying line, into the two associated conveying sections in order ultimately for thigh meat to be removed. The thigh of a poultry leg is deboned in order to obtain fillet meat. It is important according to the invention that the cuts made in preparation for pushing or scraping off the thigh meat are divided between the two conveying sections. This is achieved by introducing and suspending the poultry legs in each of the two conveying sections in an associated stationary holding and guiding gap, wherein they are thus each held in the reference position and moved in a sliding manner along the associated holding and guiding gap.

The poultry leg is conveyed transversely along the first conveying section (lateral conveying section). The transverse conveying (which is also called lateral conveying) is generally determined in that the poultry leg runs or is oriented during conveying with one of its lateral sides leading. As a result of this orientation and by the reference position for the knee joint established by the associated lateral gap guide, there can be applied in a defined manner a first front-side leg cut on the front side of the leg at the height of the knee joint with a cutting depth to the cartilage and, preferably offset in the direction of conveyance towards the end of the gap, a rear-side leg cut on the rear side of the leg at the height of the knee joint with a cutting depth to the knee joint bone.

Along the subsequent second conveying section (axial conveying section), the poultry leg is conveyed axially with the patella leading. Axial conveying is to be understood as meaning that the poultry leg is conveyed with the axial side of the leg, on which the patella is located, ahead or at the front. The leg axes, namely the axis of the thigh of the leg and the axis of the drumstick of the leg, thereby lie at least substantially in the common axial plane which in this case extends in the direction of conveyance, namely at any bending angle between the thigh and the drumstick. It is important that, as a result of this orientation and guiding in the second gap conveying way (axial gap conveying way), a second reference position similar to the first reference position already described is established. In this second reference position there are applied, in accurate positions in addition to and in accordance with the cuts in the first gap conveying way, on the two lateral leg sides of the poultry leg, at the height of the knee joint, a pair of first lateral cuts with a cutting depth to the cartilage of the bone and then a pair of second lateral cuts below the knee joint with a cutting depth to the thigh bone. With the reference positioning of the conveyed poultry leg in the first position (lateral conveying position) and then in the second position (axial conveying position) and with the sequence of the mentioned associated cuts, the cuts can be applied precisely in terms of position, cutting depth and thus in accordance with one another in the region of the knee joint for removal of the thigh meat. This method, which is preferably carried out on a continuous straight processing line, permits conveying at a relatively high speed. A plant in which the mentioned conveying sections are used can be designed without the use of curved tracks, circular tracks or carousel stations.

One embodiment consists in configuring the drive and control device for the co-running positioning elements in such a manner that, after the poultry leg has been threaded into the holding and guiding gap of the processing conveying section, the co-running positioning element lags in the direction against the direction of conveyance or is moved away from the conveying way in order to eliminate the threading bending position or to effect a reduced bending position. In particular, the co-running positioning element disengages from the poultry leg completely. The poultry leg can be held solely by the knee joint suspended in the holding and guiding gap without the engagement of elements for orienting or supporting the poultry leg on the drumstick or thigh, but with the ankle joint ball always engaged in the associated carrier for conveying the poultry leg. According to one embodiment, the configuration is such that the co-running positioning element is moved out of the position which effects the bent position for threading at the start of the holding and guiding gap.

For moving each positioning element, the drive and control device of the co-running positioning elements can be so configured that at least a pivot movement and at least a linear movement are generated, wherein the movements for moving the co-running positioning element are superimposed. In particular, a straight linear movement is generated in the direction of conveyance for co-running in the direction of conveyance. A pivot movement and/or curved movement, which can optionally be linear, is expediently produced for the two-dimensional, preferably gradual, lifting and displacement of the positioning element in the mentioned axial plane.

The processing conveying section of the holding and guiding device advantageously has at least two processing points. These are preferably arranged opposite one another on the conveying way. With regard to reliably precise but nevertheless space-saving processing, processing operations are in particular uncoupled from one another, in order to avoid mutual influencing, by offsetting the mutually opposite processing points along the conveying way. Advantageously, two cutting tools are arranged offset in a pair along the cutting way, which cutting tools perform cuts at the knee joint at least on two opposite sides of the leg. Such cuts can be made locally and with a precise cutting depth, so that the poultry leg is cut through precisely at a desired point or the cartilage and bone remain intact.

Within the stretch of the holding and conveying gap, the poultry leg held in the reference position and guided in a sliding manner can be oriented in a simple manner in accordance with processing points and/or processing operations. In one embodiment, the positioning apparatus has, at least in part of the processing conveying section of the holding and guiding device, first co-running pushing or support elements which co-run with the carriers and come to rest above the holding and guiding gap against the poultry legs upstream and/or downstream. Instead or in addition, in one embodiment, the positioning apparatus has in at least part of the processing conveying section of the holding and guiding device second pushing or support elements which co-run with the carriers and come to rest below the holding and guiding gap against the poultry legs upstream and/or downstream.

In a particular embodiment of a positioning apparatus (axial positioning apparatus) according to the invention
- the conveyor device is so arranged and configured that the carriers convey the poultry legs axially with the axial side of the leg, on which the patella is located, with the patella leading, namely in an axial plane common to the axes of the thigh bone and the drumstick bone,
- in each pair of positioning elements, the mentioned first positioning element, which is configured for engaging in the hollow of the knee of the poultry leg, is designed as the co-running positioning element of the series of co-running positioning elements, and the mentioned second positioning element, which is configured for resting against the thigh on the front side of the leg, is formed by the stationary positioning element, and
- the stationary holding and guiding gap of the holding and guiding device is formed by a knee bone guiding gap (axial guiding gap) which is configured for axial conveying and has a gap width which is so adapted to bony prominences of the knee joint conveyed with the patella leading that the poultry leg is suspended in the knee bone gap at a defined point of the knee joint bony prominences by those bony prominences and is guided in the direction of conveyance in a sliding manner on the gap edges of the knee bone gap,
- wherein the positioning elements which cooperate as a pair during bending and lifting are configured for threading and suspending the poultry leg in the knee bone guiding gap with the patella leading.

An apparatus is available in which the axially conveyed poultry legs are stabilised for precise processing, in particular on their lateral sides.

In one embodiment of the axial positioning apparatus, the stationary positioning element is so arranged and configured that at the beginning of the knee bone guiding gap, the stationary positioning element ceases to rest against the thigh of the poultry leg.

The stationary positioning element can expediently be formed by a stationary ramp of the threading device of the axial positioning apparatus having a ramp guide which is oriented upwards in the direction of conveyance at least in part, so that the thigh on the front side of the poultry leg runs onto a low guiding section of the ramp and leaves the ramp via a more highly situated guiding section. Such a ramp permits a particularly simple form, wherein particularly effective cooperation with each co-running positioning element for bending and threading the poultry leg is nevertheless achieved. In a preferred form, the ramp guide is divided in the direction of conveyance into at least two guiding sections, wherein an upper or highest guiding section, which is situated closest to the holding and guiding device, is flat, in contrast to at least one preceding guiding section.

For the axial conveying of the poultry leg in the axial bending device, each co-running positioning element can be configured in a special way. Thus, in one configuration, each co-running positioning element is formed by at least one knee hollow pushing element which engages in the hollow of the knee, wherein the drive and control device is so configured that, after the poultry leg has entered the positioning apparatus, the knee hollow pushing element presses into the hollow of the knee of the poultry leg and then, in accordance with the movement of the poultry leg effected by the stationary positioning element, is so moved and guided, preferably with continued engagement in the hollow of the knee, that, during pushing and increasing bending of the poultry leg, the pushing element precedes the carrier on which the poultry leg is suspended, in particular increasingly.

A particularly marked positioning operation can be achieved in that the drive and control device is so configured that the mentioned knee hollow pushing element, upon entry of the axially conveyed poultry leg into the axial positioning apparatus, moves from a position below the hollow of the knee of the poultry leg into the hollow of the knee. In order to achieve the orientation or positioning of the poultry leg for processing in which the poultry leg is free of the knee hollow pushing element, in one embodiment of the drive and control device the knee hollow pushing element comes to lie in the region of the holding and guiding device below the knee bone guiding gap, where the knee hollow pushing element lags at least in a part-section relative to the conveyed poultry leg or is moved away from the conveying way. An offset is achieved in that the knee hollow pushing element, for eliminating the bent position of the axially conveyed poultry leg, is in particular disengaged from the poultry leg. The offset can be so configured that the poultry leg is transported in a desired reduced bent position with the knee hollow pushing element resting against the poultry leg.

According to a further form, the bending device of the axial positioning apparatus has at least one bracing positioning element which, in the region of a section of the second, namely stationary, positioning element and together therewith, engages the front side of the axially conveyed poultry leg. This engagement temporarily takes place in such a manner that the poultry leg, in the region of the knee joint, is pressed with force, contrary to the direction of conveyance, against the co-running first positioning element, which has moved into the hollow of the knee. The bracing positioning element is advantageously arranged in the region of the beginning of the bending conveying section and/or at a section of the ramp that is steeper than at least a higher section. In one embodiment of the bracing positioning element, the bracing positioning element has at least one yielding pressing element which yields, for example swings open, when pressed in the direction of conveyance against in particular resilient restoring force and thereby frees the passage for the poultry leg. Such a pressing element can be formed, for example, by a type of swing door.

The axial positioning apparatus, which is configured for conveying the poultry legs axially, as mentioned, along a linear conveying way, can generally particularly advantageously be configured for applying lateral cuts. There can advantageously be arranged on the processing conveying section of the holding and guiding device a first stationary lateral cutting station which is formed by a first pair of first lateral cutting means—advantageously arranged offset along the conveying way—which, below the holding and guiding gap, apply first lateral cuts on the lateral sides of the poultry leg at the height of the knee joint with a cutting depth to the cartilage of the bone.

The axial positioning apparatus which is designed with the mentioned first stationary lateral cutting station can advantageously be equipped with further tools. A tool with which thigh meat is pulled or scraped from the poultry leg is advantageously provided. The form is in particular such that a pull-off station for pulling the thigh meat from the thigh bone is arranged on the processing conveying section of the holding and guiding device, following the first lateral cutting station, which pull-off station has pull-off means co-running in the direction of conveyance. The pull-off station advantageously comprises a second stationary lateral cutting station having a second pair of second lateral cutting means, which in particular are arranged offset along the conveying way. The second lateral cutting means, beneath the holding and guiding gap, apply second lateral cuts below the knee joint on the lateral sides of the poultry leg with a cutting depth to the thigh bone, and each pull-off means pushes the thigh meat to the proximal end of the thigh bone.

In a particular embodiment of the pull-off station, the co-running pull-off means forms a support and holding means which arrives at the thigh close to the knee joint upstream of at least one processing station arranged before the pull-off station (pull-off point). The support and holding means advantageously arrives at the thigh before the second lateral cuts are applied.

The positioning apparatus is preferably in such a form that third stationary cutting means are arranged downstream of the pull-off station, which third stationary cutting means separate the thigh meat at the proximal end of the thigh bone from the thigh bone.

The axial positioning apparatus having the pull-off station can expediently be equipped with a stationary cutting means associated with the pull-off station, which cutting means is preferably arranged at the end of the knee bone guiding gap and separates the defleshed thigh bone from the poultry leg drumstick bearing the drumstick meat, preferably with a cut made at the front on the front side of the leg, in particular through the knee joint.

The axial positioning apparatus in forms having one or more processing stations, in particular having the first stationary lateral cutting station and optionally additionally having the second lateral cutting station and the pull-off station, in each case forms an independent apparatus which can be inserted into a processing line as a module unit.

In another particular form of the positioning apparatus according to the invention, which instead of axial conveying is configured with lateral (transverse) conveying (lateral positioning apparatus), the conveyor device is so arranged and configured that the carriers convey the poultry legs transversely, with one of the two lateral sides of the legs leading, the mentioned first positioning element, which is configured to engage in the hollow of the knee, is the stationary positioning element which is formed by a positioning edge which is preferably part of an edge which extends along the conveying way of the positioning apparatus, preferably continuously in the positioning apparatus, the mentioned second positioning element, which is configured to rest against the thigh on the front side of the leg, is configured as the co-running positioning element of the series of co-running positioning elements which cooperates with the stationary positioning element in a pair, the stationary holding and guiding gap (lateral holding and guiding gap) of the holding and guiding device (lateral holding and guiding device) is formed by a knee bone guiding gap (lateral gap) having a gap width which is so adapted to the knee bony prominence of the knee joint of the transversely conveyed poultry leg that the transversely conveyed poultry leg is suspended at a defined point of the knee joint bony prominence in the knee bone guiding gap by that bony prominence and is guided in the direction of conveyance in a sliding manner on the gap edges of the knee bone guiding gap, wherein the positioning elements which cooperate in a pair during bending and lifting are configured for threading, namely for suspending, the transversely conveyed poultry leg in the knee bone guiding gap, wherein the mentioned reference holding edge is divided along the conveying way of the positioning apparatus into two reference holding edge sections, namely into a first reference holding edge section, which is part of the mentioned bending conveying section (lateral bending conveying section) and forms the stationary positioning edge thereof, and a subsequent second reference holding section, which forms one gap edge of the knee bone guiding gap of the holding and guiding device.

The lateral positioning apparatus according to the invention in the form in which the poultry legs are conveyed transversely has the effect that the poultry leg, in particular at its axial sides, namely at the front side of the knee and the rear side of the knee, is brought into precise processing positions for in particular a plurality of processing manipulations. Again, it is important that dynamic positioning of the poultry leg is achieved in the bending conveying section through a particularly pronounced and purposively controlled bending operation, and a reference positioning is established along the downstream stationary holding and guiding gap. The reference positioning can be maintained in at least one sliding section of the holding and guiding gap independently of the bending/threading positioning. Different and desired transport or processing positions can be established by eliminating the threading bent position or with a reduced bent position.

In a preferred form of the positioning apparatus with transverse conveying, the drive and control device of the co-running positioning element is so configured that the drive and control device disengages from the poultry leg in at least one section, in particular the end section, of the processing conveying section of the holding and guiding device in order to eliminate the bent position of the poultry leg.

A particular design of the bending device of the lateral positioning apparatus is achieved with a pressing and support mounting which co-runs in the direction of conveyance. The form is such that the lateral positioning apparatus is equipped with co-running lateral pushing elements, which are associated with the co-running positioning elements, and is so configured that the co-running positioning element and the co-running lateral pushing element, in each case in a pair, form the co-running pressing and support mounting, wherein the co-running pushing element engages the lateral side of the leg that is situated upstream in the direction of conveyance, that is to say remote from the holding and guiding device, by pushing contact in the region of the thigh of the poultry leg, and the co-running positioning element performs the movements for lifting and increasingly bending the poultry leg transversely to the direction of conveyance. The pressing and support mounting can be so configured that the co-running lateral pushing element maintains the pushing or supporting contact with the mentioned lateral side of the poultry leg at least along a part-section of the holding and guiding gap, and in particular leaves said contact only at the end of the holding and guiding gap.

In a further form, the co-running positioning element in particular of a group of co-running positioning elements of the lateral positioning apparatus is in the form of an arm-like element having two arm sections, namely having a first arm section, which substantially engages the front side of the leg with movement transversely to the direction of conveyance, and a second arm section, which substantially rests against the thigh on the lateral side of the leg situated downstream in the direction of conveyance, that is to say facing the holding and guiding device, in order to support the poultry leg. This form of the co-running positioning element of the lateral positioning apparatus is advantageously provided for resting against the thigh on the front side of left poultry legs, which are conveyed with the lateral outer side of the leg leading. For both poultry legs, and in particular only for the right poultry leg conveyed with the inner side of the leg leading, the co-running positioning element can be a contact element which has only one contact face, which engages at least substantially only the front side of the leg.

In one embodiment of the lateral positioning apparatus, the positioning apparatus has a stationary initial positioning guide extending in an initial section of the conveying way, which initial positioning guide is associated with the co-running positioning element, against which the front side of the poultry leg abuts in the region of the thigh and which guides the poultry leg transversely to the direction of conveyance against the stationary positioning element, before the co-running positioning element comes to rest against the poultry leg.

In a further form of the mentioned initial section of the lateral conveying way configured for transverse conveying, the stationary positioning element is formed along an entry-side part of the bending conveying section of the lateral positioning apparatus having an edge of wedge-shaped cross-section, the cross-section of which is adapted to a hollow between the drumstick and the thigh that is present when the poultry leg enters the positioning apparatus.

In particular, a pair of poultry legs, namely a right and a left poultry leg, is simultaneously conveyed in the positioning apparatus or apparatuses according to the invention. The pair of poultry legs is then suspended, as is known per se, on a double carrier. In transverse conveying, left and right poultry legs enter the positioning apparatus alternately in sequence. In axial conveying, left and right poultry legs are conveyed in the positioning apparatus in two parallel rows. Between transverse conveying and axial conveying, the double carriers are rotated through 90° in a rotary station. Elements, members or units of each positioning apparatus according to the invention are thus correspondingly adapted to transverse conveying in rows or parallel axial conveying.

Prominence is given to the following forms of the method according to the invention.

Advantageously, on the second gap conveying way belonging to the second holding and guiding gap, lateral cuts of at least one mentioned pair are made opposite the gap conveying way and offset along the gap conveying way. In one form, on the second gap conveying way, the second lateral cuts are guided below the knee joint into the region on the front side of the leg.

On the first gap conveying way, a second front-side cut can be made directly below the knee joint with a cutting depth to the thigh bone, wherein on the second gap conveying way the second lateral cuts are applied at the same cutting height on the poultry leg as the second front-side cut on the first gap conveying way.

It has been found that this second front-side cut on the first gap conveying way can be omitted in particular when, according to a further form of the method, the second lateral cuts on the second gap conveying way are guided below the knee joint into the region on the front side of the leg.

In the second conveying section, further processing stations for deboning (filleting) the poultry leg can expediently be arranged on the second gap conveying way, wherein in each case the poultry leg knee joint, with which the poultry leg is suspended in a sliding manner in the holding and guiding gap, represents a reference point in particular for the height position of the poultry leg for all processing steps, in particular namely for cutting, pulling off meat, also for skinning. In particular, in the second conveying section the thigh meat pushed onto the hip joint bone can be removed. A further advantageous form of the method consists in cutting through the poultry leg, advantageously at the end of the second conveying section, expediently at the height of the knee joint, in order to separate the drumstick from the defleshed thigh.

Each axially conveyed poultry leg can advantageously be threaded into the second stationary holding and guiding gap by being bent and lifted in the second conveying section along a second bending conveying section, which is upstream of the second stationary holding and guiding gap, for suspension in the second stationary holding and guiding gap. The bent positions are determined by a bending angle corresponding to the angle of the hollow of the knee between the thigh and the drumstick, which bending angle becomes smaller during lifting. This method is expediently carried out with a mentioned axial positioning apparatus which, as described, is designed in particular for conveying, positioning and processing.

In a further form of the method, each transversely conveyed poultry leg is bent and lifted transversely to the direction of conveyance in the first conveying section along a first bending conveying section, which is upstream of the first stationary holding and guiding gap, for suspension in the first stationary holding and guiding gap, wherein the bent positions are determined by a bending angle corresponding to the angle of the hollow of the knee between the thigh and the drumstick, which bending angle becomes smaller during lifting. This method is advantageously carried out with a mentioned lateral positioning apparatus which, as described, is designed in particular for conveying, positioning and processing.

In a particular form, at least in a section of a mentioned holding and guiding gap, processing is carried out on the substantially unbent poultry leg suspended in the associated holding and guiding gap. Threading bent positions are then eliminated.

Dependent claims are directed to the mentioned embodiments of the invention and to other expedient and advantageous embodiments. Only particularly expedient and advantageous forms and possibilities are described in greater detail by the following description of the embodiments shown in the schematic drawing. Each individual form or detail described within an embodiment is to be understood as being an independent detail example for other embodiments and forms which have not been described or have not been described fully and which fall within the scope of the invention.

BRIEF DESCRIPTION OF THE DRAWINGS

FIG. 1A shows a longitudinal view of a first positioning apparatus (lateral positioning apparatus) with a conveyed poultry leg in one of five conveying positions according to the present invention;

FIG. 1B shows an axonometric view of the first positioning apparatus of FIG. 1A with the conveyed poultry leg in one of five conveying positions according to the present invention;

FIG. 2A shows a longitudinal view of the first positioning apparatus with the conveyed poultry leg in one of five conveying positions according to the present invention;

FIG. 2B shows an axonometric view of the first positioning apparatus of FIG. 2A with the conveyed poultry leg in one of five conveying positions according to the present invention;

FIG. 3A shows a longitudinal view of the first positioning apparatus with the conveyed poultry leg in one of five conveying positions according to the present invention;

FIG. 3B shows an axonometric view of the first positioning apparatus of FIG. 3A with the conveyed poultry leg in one of five conveying positions according to the present invention;

FIG. 4A shows a longitudinal view of the first positioning apparatus with the conveyed poultry leg in one of five conveying positions according to the present invention;

FIG. 4B shows an axonometric view of the first positioning apparatus of FIG. 4A with the conveyed poultry leg in one of five conveying positions according to the present invention;

FIG. 6A shows a longitudinal view of parts of a second positioning apparatus (axial positioning apparatus) according to the present invention;

FIG. 6B shows an axonometric view of the parts of the second positioning apparatus of FIG. 6A according to the present invention;

FIG. 17A shows a longitudinal view of parts of the second positioning apparatus with conveyed poultry legs in a processing position according to the present invention;

FIG. 17B shows an axonometric view of parts of the second positioning apparatus of FIG. 17A with conveyed poultry legs in the processing position according to the present invention;

DETAILED DESCRIPTION OF EMBODIMENTS

Figure 5B:
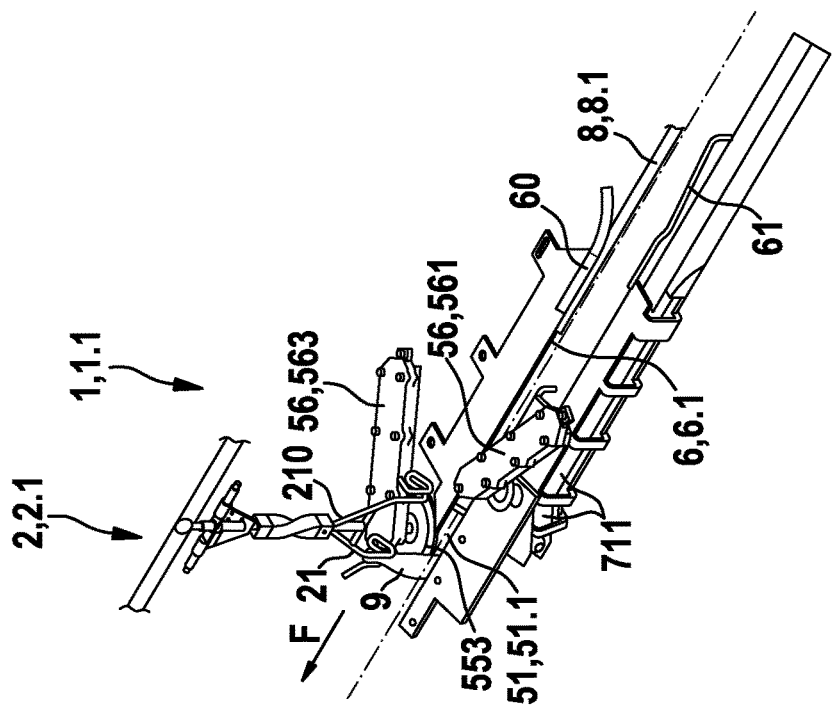
FIG. 5B shows an axonometric view of the first positioning apparatus of FIG. 5A with the conveyed poultry leg in one of five conveying positions according to the present invention.
Figure 5A:
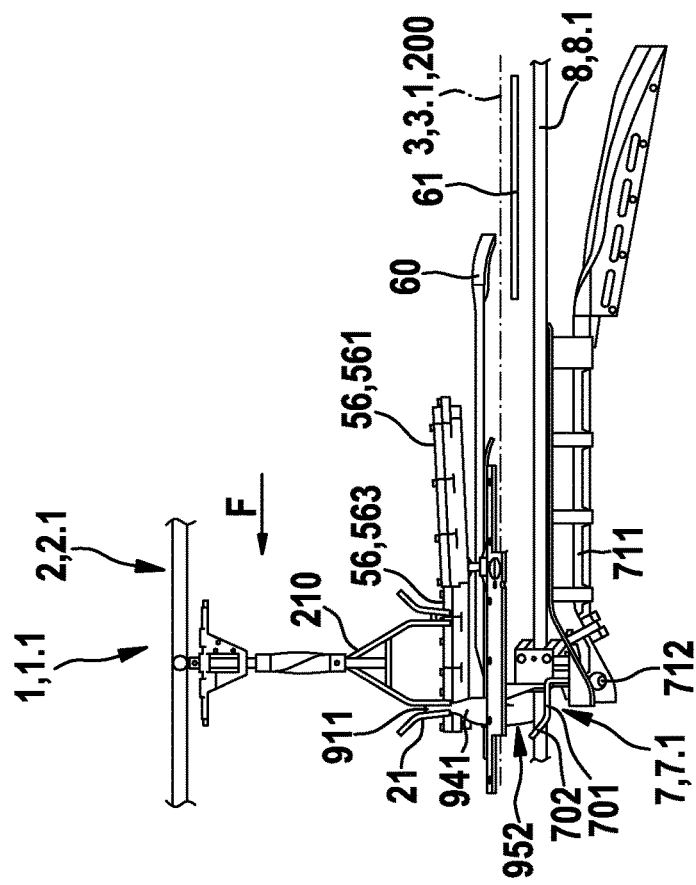
FIG. 5A shows a longitudinal view of the first positioning apparatus with the conveyed poultry leg in one of five conveying positions according to the present invention.

FIG. 1A/B (FIG. 1) to FIG. 5A/B (FIG. 5) show an embodiment of a first positioning apparatus 1 according to the invention, which is also referred to as a lateral positioning apparatus 1.1. A further example of a positioning apparatus 1 according to the invention, namely a second positioning apparatus which is also referred to as an axial positioning apparatus 1.2, is shown in FIG. 6A/B (FIG. 6) to FIG. 17A/B (FIG. 17).

Members and units of the two mentioned positioning apparatuses 1 will first be described, insofar as they apply analogously and generally to the positioning apparatuses of examples 1.1 and 1.2 and any positioning apparatus according to the invention. In order that important parts of the apparatuses are clearly visible in the drawing, framework, frame and connecting parts, on which the members and units are mounted and by which they are connected to one another, as well as drive motors or similar elements are not shown.

Each positioning apparatus 1 has a bending device 4 forming a threading device, as well as a holding and guiding device 5, which are arranged along a conveying way (conveying path) 3 which is linear in the direction of conveyance F. Each positioning apparatus 1 is further equipped with a conveyor device 2 which has along the conveying way 3 a series of movable carriers 21 for transporting poultry legs 9 in a suspended position.

Figure 18:
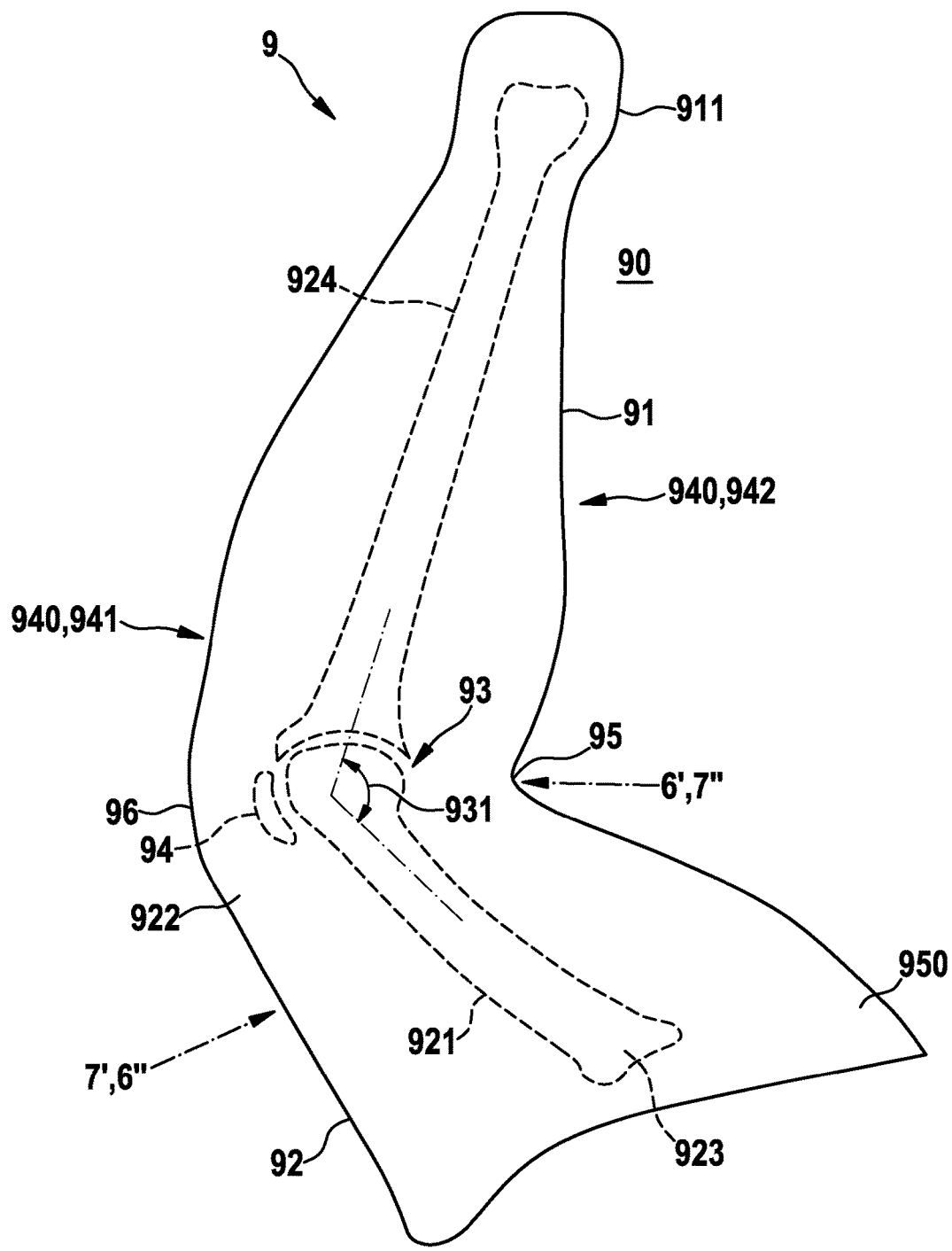
FIG. 18 shows, in a side view, a partially bent poultry leg.

As is illustrated by FIG. 18, the poultry legs 9 are legs with meat which have been separated from a poultry body and whose drumstick 91 and thigh 92 are connected to one another by the knee joint 93. An axial side 940 of the leg, on which the patella 94 is located, is referred to as the front side 941 of the leg, and the other axial side 940 of the leg, on which the hollow of the knee 95 is located, forms the rear side 942 of the leg. The axis of the thigh bone 921 and the axis of the drumstick bone 924 of the poultry leg 9 extend substantially in a poultry leg axial plane 90. The poultry leg 9 shown schematically in FIG. 18 can be considered both as a left poultry leg and as a right poultry leg. In FIGS. 1 to 17, the poultry legs 9 in the conveying line shown are considered to be left poultry legs.

The conveyor device 2 is an overhead or suspended conveyor device, on which the carriers 21 are suspended at a uniform height and conveyed along a circular path. Each poultry leg 9 is engaged by its ankle joint ball 911 in an associated carrier 21, in the example a carrier clamp 211. The drawing in FIGS. 1 to 17 shows only one carrier 21 loaded with a left poultry leg 9 of the carriers following one another in the direction of conveyance F.

Each bending device 4 has a stationary positioning element 6, which extends in a bending conveying section 31 of the conveying way 3, and a series of co-running positioning elements 7. Each positioning element 7 co-runs in the direction of conveyance F in association with an associated carrier 21. In the drawing, only the positioning element 7 associated with the loaded carrier 21 is shown. A co-running positioning element 7 with the stationary positioning element 6 in each case forms a pair of positioning elements.

As is shown schematically in FIG. 18 at 6'/7' and 6''/7'', each pair of positioning elements 6, 7 is so configured that, during conveying, each pair of positioning elements 6, 7 lifts a poultry leg 9 brought by its knee joint 93 between the two positioning elements 6, 7 and thereby bends the poultry leg with an angle of the hollow of the knee corresponding to the bending angle 931. One of the positioning elements 6, 7 is arranged and configured for engaging in the hollow of the knee 95 of the poultry leg 9, while the other positioning element 6, 7 is arranged and configured to rest against the thigh 92 on the front side 941 of the leg. In FIG. 18, the pairing 6'/7' relates to the positioning device 1.1, while the pairing 6''/7'' relates to the positioning device 1.2.

The co-running positioning elements 7 are formed by driven pressing elements, which are driven and moved by a drive and control device 8. This device is shown schematically in each case only with important elements which move the co-running positioning elements 7 for co-running in the direction of conveyance F as well as for bending two-dimensionally in the lifting direction and transversely thereto in the direction of the poultry leg axial plane 90. The guiding/control elements are, for example, slotted elements, cams, rails, rods, pivot elements, pushing elements or the like, which guide, orient and position the co-running positioning elements 7. Such control/guiding devices are in principle known in many different forms. In particular, the drive for the co-running movement is realised by a driven strand 80, for example a chain moved and guided in a revolving manner on which the co-running positioning elements 7 are arranged and fixed in a row. The positioning movement of the co-running positioning element 7 can advantageously be configured by a time/displacement control of the drive and control device in such a manner that the positioning movement increases, that is to say is progressive. In the drawing, a section of a strand 80, which is part of the drive and control device 8, which has moved in the direction of conveyance F is shown only by a fragment.

The conveying way 3 has a bending conveying section 31 belonging to the bending device 4. Along this bending conveying section 31, each pair of positioning elements 6, 7 effects the lifting and bending of the poultry leg 9 into a specific, in particular maximum bent position at the end of the bending conveying section 31.

The bending conveying section 31 is followed by a processing conveying section 32 of the conveying way 3. The holding and guiding device 5 extends along the processing conveying section 32. An important component of the holding and guiding device 5 is a holding and guiding gap 51 which extends linearly in the conveying way 3 and is formed between two gap edges 52, 53. The holding and guiding gap 51 is so configured that the holding and guiding gap 51 receives each poultry leg 9 in the region of the knee joint 93 between its gap edges 52, 53. That is to say, the two gap edges 52, 53 grasp knee joint bones from beneath and thereby form a kind of gap rail guide, in which the poultry leg 9 is suspended by bony prominences of its knee joint 93 and corresponding thickened leg portions and can be pushed along the gap 51, namely with sliding contact of the leg meat between the knee joint 93 and the gap edges 52, 53. The gap edges 52, 53 are expediently chamfered in order to facilitate the sliding movement.

The holding and guiding gap 51 extends in a vertical plane, along which the carriers 21 are moved. In the embodiments, the gap edges 52, 53 extend at the same height in relation to the axial dimension of the poultry leg 9. The gap edges can also be offset slightly relative to one another in terms of height. In any case, they form along the processing conveying section 32 a stationary guide in which the knee joint 93 of each poultry leg 9 is moved in the direction of conveyance F with a defined height of the knee joint. According to the embodiments, the knee joint 93 is located along the processing conveying section 32 in a reference position with a uniform height position. The reference positioning can, however, also be configured with reference positions which change, for example in steps, for example with a guiding reference gap which at least in portions is inclined and/or extends with a curve in a vertical conveying plane. In all cases, the path is linear in the sense that the conveying way 31 is oriented free of horizontal deflections, thus free of carousel guiding, in at least a substantially straight line 200 in the vertical conveying plane.

The bending device 4 forms the threading device in that each poultry leg 9 arrives in the specific lifted and bent position with its knee joint 93 precisely positioned for threading and suspending of the poultry leg 9 in the holding and guiding gap 51. It will generally be seen that the poultry legs 9 are guided, through suspension in the holding and guiding gap 51 or by transfer thereto, with a reference positioning relative to the knee joint 93 in which the axial orientation of the poultry leg 9 for processing thereof is independent of a bending or a bent position at the end of the bending conveying section 31.

The positioning apparatus 1 described hitherto is an independent module unit at which a plurality of processing points can be arranged, preferably opposite and offset relative to one another in the conveying way 3. Examples of the arrangement of processing stations 56 can be seen with reference to the positioning apparatuses 1.1 and 1.2.

In the following, the lateral positioning apparatus 1.1 according to FIGS. 1 to 5 will be described in greater detail. For this description there are used inter alia reference numerals which relate to the parts and details described generally hereinbefore but which are now provided with an additional individualising reference numeral (decimal place).

By the conveyor device 2.1, the poultry legs 9 are conveyed transversely, wherein a left poultry leg 9 is to be seen in the embodiment, which is conveyed with its lateral outer side 950, 952 leading.

The stationary positioning element 6, 6.1 is formed by a stationary positioning edge, which is part of a continuous reference holding edge along the conveying way 3.1. Reference numeral 6.1 is also used in the following for the positioning edge as the stationary positioning element. Each co-running positioning element 7.1 of the series of co-running positioning elements is configured to rest against the thigh 92 on the front side 940, 941 of the leg.

The bending device 4.1 has the stationary positioning edge 6.1, which engages in the hollows 95 of the knees of the transversely conveyed poultry legs 9, as well as the series of co-running positioning elements 7.1, which are brought by the drive and control device 8.1, in each case with a movement component in the poultry leg axial plane 90, to rest against the thigh 92 on the front side 941 of the leg.

Only important parts of the bending device 4.1 along the bending conveying section 31.1 are shown, wherein a co-running positioning element 7.1, which passes through the bending conveying section 31.1, is shown in FIGS. 1 to 5 in five positions, from which the positions of the poultry leg 9 located between the co-running positioning element 7.1 and the positioning edge 6.1 are also apparent.

The co-running positioning element 7.1 formed by an angle piece has two arm sections, namely a first arm section 701 and a second arm section 702, oriented at an angle to one another. The angle piece is so guided and moved by the drive and control device 8.1 that the arm section 701 substantially engages the front side 941 of the leg while moving transversely to the direction of conveyance F. The second arm section 702 is so oriented and so moved that the second arm section 702 is oriented transversely to the direction of conveyance F and, co-running in the direction of conveyance F, rests against the thigh 92 substantially at the lateral outer side 952 of the leg located downstream in the direction of conveyance F, for support thereof. The offset movement, guided in a controlled manner, of the double-armed co-running positioning element 7.1 is such that the element is moved in the poultry leg axial plane 90, which advances in the direction of conveyance F, with two superimposed movement components in the direction towards the positioning edge 6.1, namely in a direction which lifts the poultry leg 9 and in a direction transversely thereto which moves the thigh 92 of the poultry leg 9 into the region beneath the positioning edge 6.1. In the embodiment and generally, the co-running positioning element 7.1 can also simply be formed by an element corresponding to the arm section 701, for example in the form of an arm or a plate, for engaging solely or at least substantially the front side 941 of the leg.

The lateral positioning device 1.1 further has a series of lateral pushing elements 811 which co-run with the carriers 21 in the direction of conveyance F and are associated with the positioning elements 7.1 and form therewith running pairs which co-run in the direction of conveyance F and form a pressing and support mounting.

The co-running pushing element 811 engages on the lateral side 950, 951 of the leg that is situated upstream in the direction of conveyance F in the region of the poultry leg thigh 92. The co-running lateral pushing elements 811 can be moved in the direction of conveyance F by a conveyor means which also moves the co-running positioning elements 7.1 in the direction of conveyance and in that respect is part of the drive and control device 8.1. The lateral pushing elements 811 can, however, also be moved by a drive means that is independent of the drive and control device 8.1, for example by a strand-type drive such as a driven revolving chain or similar means, to which the series of lateral pushing elements 811 is fixed.

In the embodiment of FIGS. 1 to 5, the co-running positioning element 7.1 is pivotably connected to a carriage 81. The carriage 81 fixed to the drive strand 80 supports the lateral pushing element 811. The pivot connection of the positioning element 7.1 is effected about a pivot axis 710 which is oriented longitudinally according to the direction of conveyance F. The pivot movement of the positioning element 7.1, which effects the mentioned offsetting movement, is effected by a stationary guide path 711 arranged along the conveying line 200 and a pivot guiding arm 712 which is guided thereon and connected to the positioning element 7.1 and which is oriented transversely to the direction of conveyance F. Any other movement control can be configured to generate the conveying and transverse movement of the positioning element 7.1.

As is apparent from FIGS. 1 to 5, the positioning apparatus 1.1, or the bending device 4.1, has a stationary (fixed) initial positioning guide 61 which extends in an initial section of the conveying way 3.1 and is associated with the co-running positioning elements 7.1. The initial positioning guide 61 is formed by a guide rod which brings each poultry leg 9 entering the positioning apparatus 1.1 into a starting position against the positioning edge 6.1, whereby the guide rod and the positioning edge 6.1 may converge slightly in the direction of conveyance F. The initial positioning guide 61 ends in a region in which the co-running positioning element 7.1 takes over positioning of the poultry leg 9.

In the embodiment, the stationary positioning edge 6.1 is formed along an entry-side section, in which the rear side 942 of the poultry leg 9 first comes to rest against the stationary positioning element 6.1, having an edge 60 that is wedge-shaped in cross-section, the orientation and cross-section of which is adapted to a hollow between the drumstick 91 and the thigh 92 of the poultry leg 9 on entry into the positioning device 1.1.

In any case, the carriers 21 of the conveyor device 2.1 are so arranged in terms of height in relation to the stationary positioning edge 6.1 that each poultry leg 9 on entering the bending device 4.1 comes to rest against the rear side 942 of the leg in the hollow of the knee 95 of the leg and preferably slightly above the hollow of the knee 95 of the leg, that is to say against the drumstick 91.

FIG. 1 shows the left poultry leg 9 in the position in which the poultry leg 9 is transferred from the stationary initial positioning guide 61 to the associated co-running positioning element 7.1. It will be seen that, in this position, the associated co-running lateral pushing element 811 also comes to rest against the lateral inner side 951 of the leg.

In FIG. 2, the left poultry leg 9 has been conveyed further along the bending device 4.1 into an intermediate position. In this position, the poultry leg 9 is in a position in which the poultry leg 9 has been lifted by the co-running positioning element 7.1, so that the positioning edge 6.1 grips part of the drumstick 91 from beneath and engages far into the hollow of the knee 95, the poultry leg 9 having been brought into a positioning bent position. Lifting of the poultry leg 9 is discernible by the ankle joint ball 911 lifted in the carrier 21.

FIG. 3 shows a position of the poultry leg 9 in which the poultry leg 9 has been bent slightly further by the co-running positioning element 7.1, that is to say the bending angle 931 has become smaller, whereby the stationary positioning edge 6.1 has been pushed further into the hollow of the knee 95. In this position, the poultry leg 9 enters the holding and guiding gap 51.1 at the height of its knee joint 93. The poultry leg 9 is thereby threaded and suspended in the holding and guiding gap 51.1 by its knee joint 93.

While the poultry leg 9 is passing through the bending conveying section 31.1, the poultry leg 9 slides in the region of its hollow of the knee 95 along the positioning edge 6.1. The positioning edge 6.1 merges into a second reference holding edge section, which forms one gap edge 52.1 of the holding and guiding gap 51.1. The positioning edge 6.1 and the first gap edge 52.1 are expediently configured as sliding edges of guide plates 511. The first gap edge 52.1 and the positioning edge 6.1 can be the edge of a single plate. The two edges can also belong to different guiding sections.

The holding and guiding gap 51.1 of the holding and guiding device 5.1 can narrow a little in the direction of conveyance F. However, this convergence is optionally so slight and the form is such that the laterally conveyed poultry leg 9—regardless of whether the poultry leg 9 is a left poultry leg 9 with the lateral outer side 952 of the leg leading or a right poultry leg 9 with the lateral inner side 951 of the leg leading (or vice versa)—is reliably threaded into the holding and guiding gap 51.1. The plates 511 for forming the holding and guiding gap 51.1 are expediently arranged at the same height.

By the poultry leg 9 suspended in the holding and guiding gap 51.1, the knee joint 93 thereof is located in a reference position at any point along the holding and guiding gap 51.1. The knee joint 93 of the transversely conveyed poultry leg 9 forms a knee joint bony prominence with which sliding suspension of the poultry leg 9 in the holding and guiding gap 51.1 is achieved. The holding and guiding gap 51.1 is adapted to the mentioned bony prominence, namely in such a manner that poultry legs 9 of different sizes are received in a sliding manner.

The lateral positioning apparatus 1.1 is an apparatus which is provided and configured along the holding and guiding gap 51.1 to be equipped with or for the attachment of processing tools and processing stations 56 at processing points. In the embodiment, the holding and guiding device 5.1 is equipped with two cutting stations 561 and 563.

The first cutting station is a stationary front-side cutting station 561, which is arranged on an entry-side part conveying section of the holding and guiding device 5.1. The front-side cutting station 561 has a cutting means 551 which operates above the holding and guiding gap 51.1 and is formed in particular, as in the embodiment, by a circular knife which moves against a set spring force and is mounted on a pivotable holding arm 54, 541. In the embodiment, a cut with a cutting depth to the cartilage is applied on the front side 941 of the poultry leg 9 at the height of the knee joint 93 by the front-side cutting station 561. This cutting position can be seen in FIG. 4.

In the embodiment, the drive and control device 8.1 with the co-running positioning elements 7.1 is so configured that the lifting and bending position which is reached for threading and suspension of the poultry leg 9 at the end of the bending conveying section 31.1 is retained for the cut by the cutting station 561. To that end, the guiding arm 712 is held by a path section 713 of the guide path 711 in an inwardly pivoted position for bending. Control of the drive and control device 8.1 is further so configured in the embodiment that the positioning element 7.1, after passing through the cutting station 561, is guided away from the holding and guiding gap 51.1 in order to eliminate the bent position effected by the positioning element 7.1. The guiding arm 712 is pivoted back and lowered by a curve section 714. The lifted position of the poultry leg 9 is thereby retained according to the knee joint 93 suspended in the holding and guiding gap 51.1.

In the embodiment, a further stationary cutting station, namely a rear-side cutting station 563, is arranged on the processing conveying section 32.1 of the holding and guiding device 5.1, which further cutting station has a cutting means 553 which operates above the holding and guiding gap 51.1 and is formed by a circular knife. The circular knife is mounted on a pivot arm 543 so that the circular knife moves against spring force. As is shown in FIG. 5, the rear-side cutting station 563 produces a cut with a cutting depth to the knee joint bone on the rear side 942 of the leg at the height of the knee joint 93. By suspension by its knee joint, the poultry leg 9 is thereby in the reference position achieved thereby. In this case, the bent position effected by the co-running positioning element 7.1 is no longer present. The cut produced by the front-side cutting station 561 at the height of the knee joint 93 can be used to assist the sliding and suspended guiding of the knee joint 93 on the second gap edge 53.1.

Figure 19:
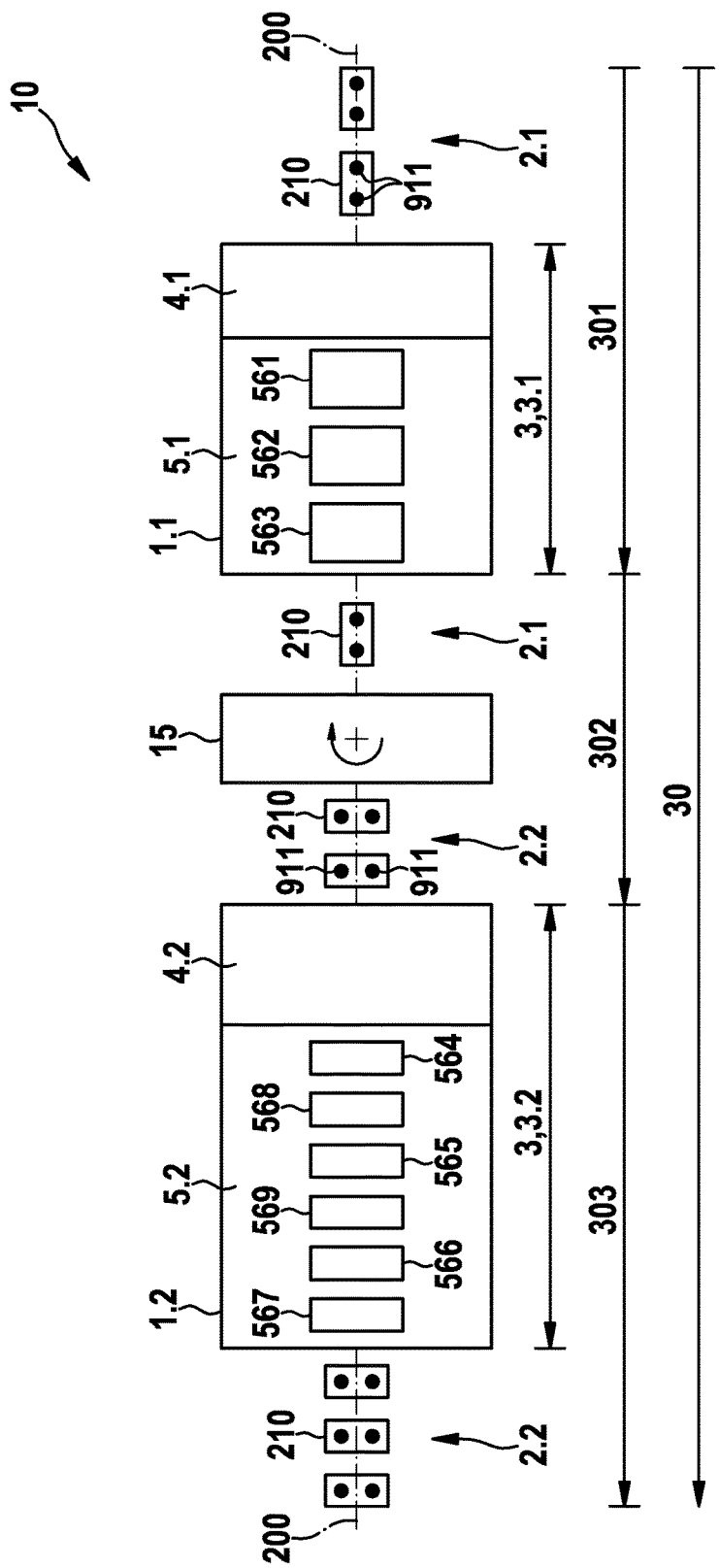
FIG. 19 shows, in a block diagram and in a plan view, a positioning apparatus according to the invention which is formed by a lateral positioning apparatus according to the invention and a downstream axial positioning apparatus according to the invention connected thereto.

As is shown only schematically in FIG. 19, according to a further example a second stationary front-side cutting station 562 is arranged on the processing conveying section 32.1 of the holding and guiding device 5.1, which cutting station has a cutting means which operates beneath the holding and guiding gap 51.1. This cutting means can be provided for applying a cut with a cutting depth to the thigh bone 921 on the front side 941 of the leg, directly below the knee joint 93. A circular knife is expediently arranged on a spring-loaded pivot arm.

The plane of each circular knife of the first positioning apparatus 1.1 lies horizontally or slightly obliquely to the horizontal orientation, so that the cut is in each case applied and performed at the described points transversely to the axial orientation of the poultry leg 9.

The carriers 21 are double components of a double carrier 210 on which there are to be suspended, in the carrying position parallel to the direction of conveyance F, the left poultry leg 9 leading and a right poultry leg following. For processing of the right poultry legs, the bending device 4.1 is equipped with parts and members (not shown) which correspond to those designated 7.1, 701, 702 and 811 and in particular can be specially adapted for resting against the right poultry leg conveyed with the inner side 951 of the leg leading. It has been found to be advantageous for the co-running positioning element then to be in the form of an arm or plate, for example, and to engage substantially only the front side of the leg. The co-running positioning elements 7.1 are then divided alternately into two groups for the left and right poultry legs.

In the following, the axial positioning apparatus 1.2 according to FIGS. 6 to 17 will be described in greater detail. For this description there are used inter alia reference numerals which relate to the parts and details described generally hereinbefore but which are now provided with an additional individualising reference numeral (decimal place).

By the conveyor device 2.2, the poultry legs 9 are conveyed axially, that is to say with the axial side 940 of the leg, namely the front side 941 of the leg, leading. In the embodiment, a left poultry leg 9 is being conveyed. The stationary positioning element 6, 6.2 is formed by a stationary ramp of the threading device having a ramp guide which is directed upwardly in the direction of conveyance F. Reference numeral 6.2 is also used in the following for the stationary ramp as the stationary positioning element. Each co-running positioning element 7, 7.1 of the series of co-running positioning elements is configured for engaging in the hollow of the knee 95 of the poultry leg 9.

The bending device 4.2 has the stationary ramp 6.2, against which the thigh 92 on the front side 941 of the leg comes to rest, as well as the series of co-running positioning elements 7.2, which each engage by the drive and control device 8.2 in the hollows of the knees 95 of the poultry legs 9 conveyed axially with the front side 941 of the leg leading.

In FIGS. 6 to 17, only important parts of the bending device 4.2 along the bending conveying section 31.2 are shown, one of the co-running positioning elements 7.2, which passes through the bending conveying section 31.2, being shown in eleven positions, from which the positions of the poultry leg 9 located between the co-running positioning element 7.2 and the stationary ramp 6.2 are also apparent.

The stationary ramp 6.2 is divided into six guiding sections 621 to 626 along the bending conveying section 31.2. The ramp 6.2 begins upstream with a relatively steep section 621, which is followed by a less steep section 622. The latter is followed by a flat horizontal section 623, which is followed by a section 624 having a further reduced gradient. Following the section 624 there is a horizontal flat section 625 which is approximately twice as long as the remaining sections, and the ramp 6.2 is formed at its end with a descending section 626. The embodiment of the axial positioning device 1.2 is not limited to such a stationary positioning element (ramp) 6.2. It is possible to provide any stationary positioning element 6.2 defined generally at the beginning which, in cooperation with the co-running positioning element 7.2, effects bending and lifting for the purpose of threading.

The axial positioning apparatus 1.2 optionally further has a stationary bracing positioning element 65 which, together with the ramp 6.2, is provided for engaging the front side 941 of the leg. The bracing positioning element 65 is arranged in particular on an ascending section of the ramp 6.2, for example in the region of the second guiding section 622.

In the embodiment, the stationary bracing positioning element 65 has two pivot arms 651, 652 which are articulated against spring force and which, in the manner of a swing door, form a passage for the conveyed poultry leg 9. The pivot arms 651, 652 initially prevent the poultry leg 9 from passing but then pivot to the side against spring force and while maintaining contact with the poultry leg 9, so that the poultry leg 9 passes against a counter-force generated at the position of the bracing positioning element 65. Any bracing positioning element which generates a temporary counter-force can be used.

Each co-running positioning element 7, 7.2 is formed by a knee hollow pushing element which engages in the hollow of the knee 95 of the poultry leg 9 on the axial side 940 of the leg located upstream in the direction of conveyance F, namely the rear side 942 of the leg. Reference numeral 7.2 is also used in the following for the knee hollow pushing element as the co-running positioning element.

In the embodiment, the knee hollow pushing element 7.2 is an arm-like element having a recess in which the hollow of the knee 95 comes to lie. The knee hollow pushing elements 7.2 are, for example, fixed in a row arrangement to a revolving drive element 720, for example to a strand or a chain of the drive and control device 8.2, whereby they each, in association with a carrier 21, come to lie with an orientation in the direction of conveyance F and transversely thereto.

The drive and control device 8.2 is generally so configured that, when the poultry leg 9 enters the positioning apparatus 1.2, the knee hollow pushing element 7.2 moves from a position situated beneath the hollow of the knee 95 of the poultry leg 9 into the hollow of the knee 95.

In the embodiment, each knee hollow pushing element 7.2 is fixed via a pivot arm 721 to a shaft 722 which passes through an associated carriage 723 which is fixed to the drive element 720. The pivot arm 721 is pivotable to and fro between two stop positions. The stop positions are determined by the ends of a slot 724 formed in the pivot arm 721, which slot is formed by a circular section and into which there engages a stop bolt 725 which is fixed to the carriage 723. Pivot positions of the pivot arm 721 are effected by a rotary control (not shown) of the shaft 722 in dependence on the position of the carriage 721 along the conveying path.

The rotary control has, for example, a lever fixed to the shaft 722, the pivot position of which lever is controlled via a follower element, which engages into a guide path extending along the conveying path in such a manner that the pivot arm 721 is pivoted to the left or right in dependence on the height position of the follower element. The knee hollow pushing element 7, 7.2 enters the hollow of the knee 95 at intermediate positions of the stop bolt 725 inside the slot 724. As the position of the pivot arm 721 becomes increasingly steeper, the knee hollow pushing element 7.2 is pushed into the hollow of the knee 95. The degree of this displacement is determined by the shape or gradient of the guide path.

As is apparent from FIGS. 6 to 17, the bending device 4.2 is equipped with a routing 63. This is formed by a pair of guide rods, which extend in parallel along the bending conveying section 31.2 and form a lateral guide against which the conveyed poultry legs 9 come to rest laterally in the region of the thicker part of the drumstick. The routing 63 is an auxiliary guide for preventing the poultry legs 9 from being deflected or rotating transversely to the direction of conveyance F.

The carriers 21 of the conveyor device 2.2 are so configured at the same height that the co-running positioning elements 7.2 enter the hollows of the knees 95 of the poultry legs 9 at the entry to the bending device 4.2.

Figure 7B:
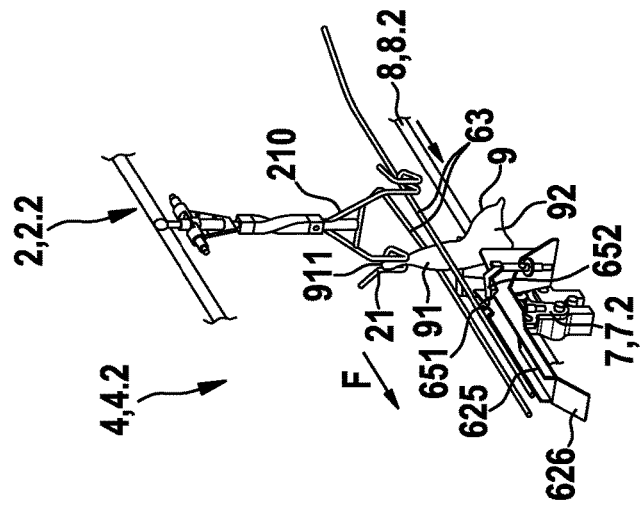
FIG. 7B shows an axonometric view of the parts of the second positioning apparatus of FIG. 7A with conveyed poultry legs in one of three threading bent positions according to the present invention.
Figure 7A:
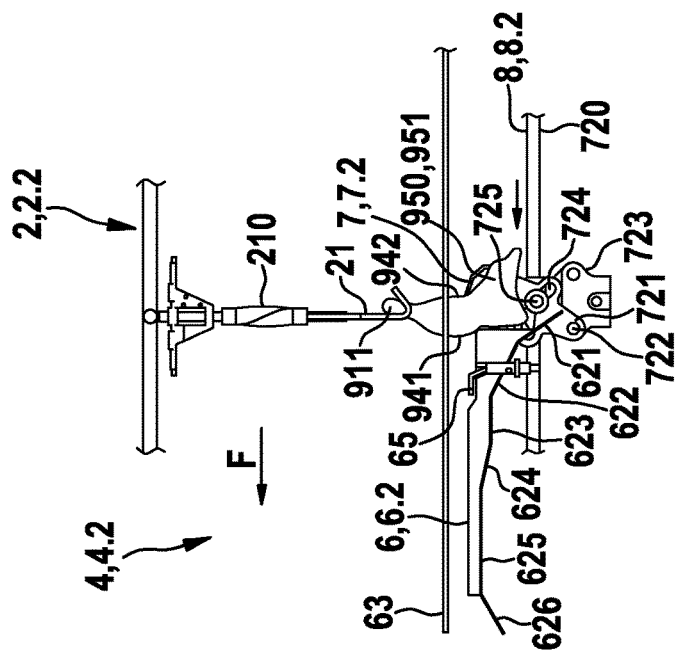
FIG. 7A shows a longitudinal view of parts of the second positioning apparatus with conveyed poultry legs in one of three threading bent positions according to the present invention.

FIG. 7 shows the left poultry leg 9 at the entry of the bending device 4.2 in a freely suspended position with the ankle joint ball 911 suspended in the carrier 21. In this position, the poultry leg 9 has not quite reached the stationary positioning element 6.2, and the co-running positioning element 7.2 is situated in a position shortly before engagement into the hollow of the knee 95, both in terms of time and location. In this position, the co-running positioning element 7.2 is in a position beneath the hollow of the knee 95, that is to say in a correspondingly downwardly pivoted position of the pivot arm 721 lagging behind the associated carrier 21.

Figure 8B:
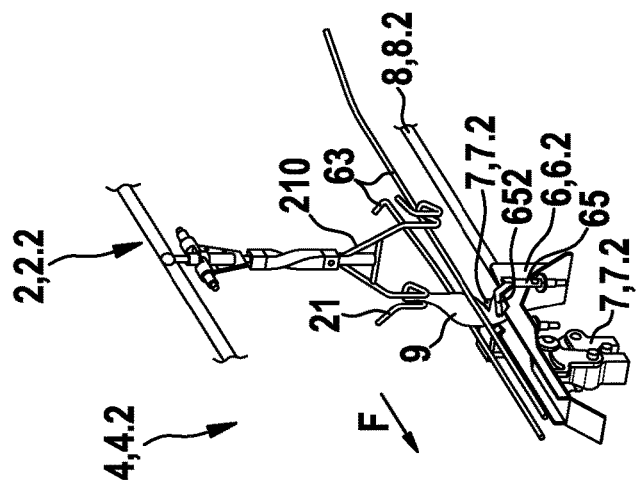
FIG. 8B shows an axonometric view of the parts of the second positioning apparatus of FIG. 8A with conveyed poultry legs in one of three threading bent positions according to the present invention.
Figure 8A:
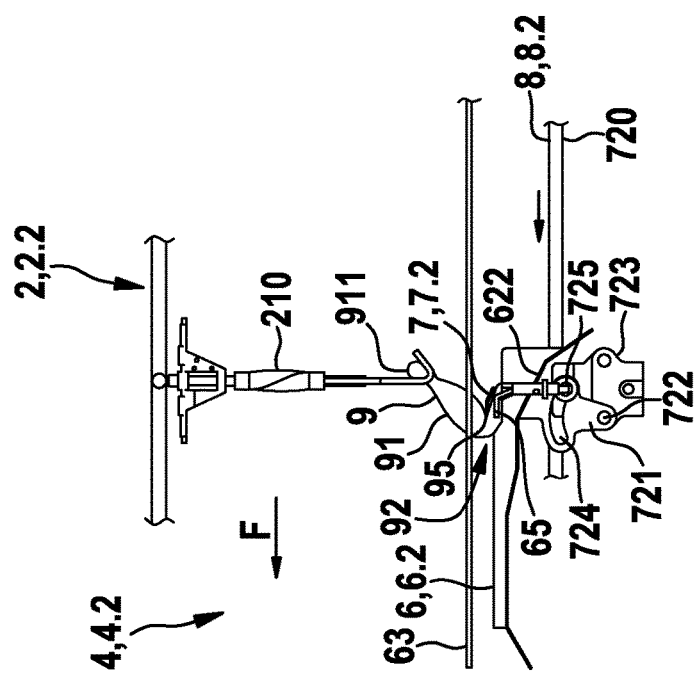
FIG. 8A shows a longitudinal view of parts of the second positioning apparatus with conveyed poultry legs in one of three threading bent positions according to the present invention.

In FIG. 8, the left poultry leg 9 has been conveyed further along the bending device 4.2 into an intermediate position. In this position, the poultry leg 9 is in a first phase of lifted and bent position. The poultry leg 9 is shown in the position in which the stationary positioning element 6.2, the stationary bracing positioning element 65 and the co-running positioning element 7.2 are in contact with the poultry leg 9. The co-running positioning element 7.2 has been pivoted from the lower pivot position into a steep pivot position in which the co-running positioning element 7.2 engages in the bent hollow of the knee 95. The co-running positioning element 7.2 is located in advance of the carrier 21, or the ankle joint ball 911, in the direction of conveyance F. Consequently, the poultry leg 9 reaches a V-shaped position in which the patella 94, or the knee cap 96, is leading in the direction of conveyance F on the closed side of the V-shaped formation. The thigh 92 of the poultry leg 9 thereby runs onto the second section 622 of the stationary positioning element 6.2. In addition, the stationary bracing positioning element 65 grips the poultry leg 9 with its two arms 651, 652 slightly beneath the position of the co-running positioning element 7.2. Consequently, the arms 651, 652 in the phase shown form a counter-support beneath the knee joint 93 in the region thereof. This counter-support, which is under resilient restoring force, is overcome when the bracing positioning element 65 is passed.

Figure 9B:
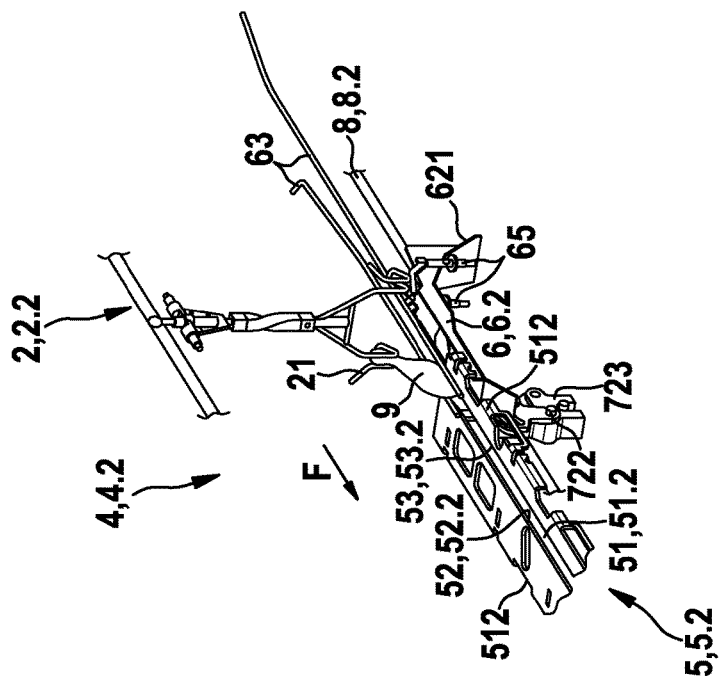
FIG. 9B shows an axonometric view of the parts of the second positioning apparatus of FIG. 9A with conveyed poultry legs in one of three threading bent positions according to the present invention.
Figure 9A:
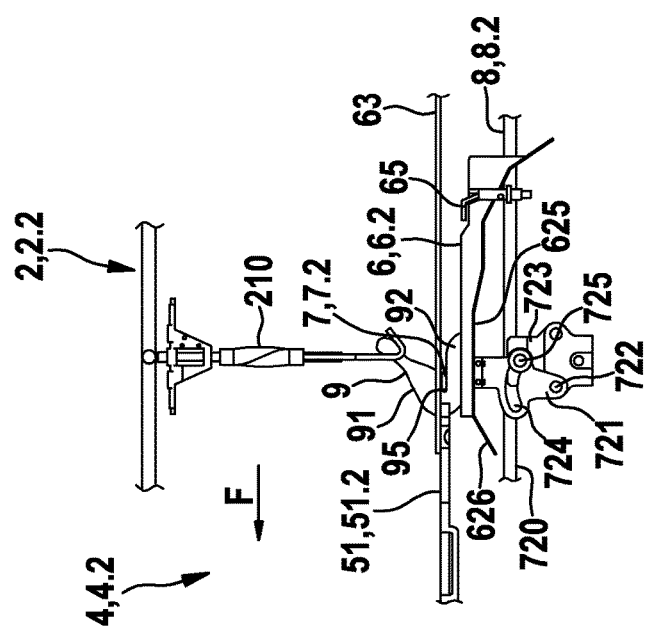
FIG. 9A shows a longitudinal view of parts of the second positioning apparatus with conveyed poultry legs in one of three threading bent positions according to the present invention.

FIG. 9 shows a position of the poultry leg 9 in which the poultry leg 9 has been lifted even further, and the bending angle 931 has become even smaller, into a maximum bent position. The thigh 92 has run onto the upper section 625 of the stationary positioning element 6.2, and the co-running positioning element 7.2 has been pushed further into the hollow of the knee 95.

In this position, the poultry leg 9 enters the holding and guiding gap 51.2 at the height of its knee joint 93. The poultry leg 9 is thereby threaded and suspended in the holding and guiding gap 51.2 by its knee joint 93. The poultry leg 9 assumes the mentioned, more pronounced V-shaped bent position, in which the co-running positioning element 7.2 precedes the carrier 21 in the direction of conveyance F.

It is clear from the axonometric representations of FIGS. 6 to 17 that each carrier 21 is part of a double carrier 210 on which the left poultry leg 9 is suspended on one carrier—the right-hand carrier in the direction of conveyance F—in a position transversely to the direction of conveyance F. The other carrier 21 is configured for transporting the right poultry leg 9. The positioning apparatus 1.2 is accordingly equipped with parallel ways and corresponding means for transporting, positioning and processing the right poultry legs too. The parallel ways and elements for the right poultry legs are not shown in the drawing of FIGS. 6 to 17. The lateral sides of the two poultry legs (left/right) in associated conveying lines are transposed. Accordingly, the mentioned means are also arranged laterally transposed. In FIG. 19, two parallel lines for both poultry legs can be seen. In principle, the invention is realised with only one leg conveying line, as described by FIGS. 1 to 17.

FIGS. 6, 9 to 17 show the holding and guiding device 5.2 of the axial positioning apparatus 1.2.

The holding and guiding gap 51.2 has a constant width. This gap is particularly suitable for suspending and conveying by sliding the poultry legs 9 with the patella 94 leading. The holding and guiding gap 51.2 is expediently formed between two plates 512 arranged at the same height.

By the poultry leg 9 suspended in the holding and guiding gap 51.2, the knee joint 93 thereof is always in a reference position at any point along the holding and guiding gap 51.2. The knee joint 93 of the axially conveyed poultry leg 9 forms a knee joint bony prominence, or a thickened leg portion, with which sliding suspension of the poultry leg 9 in the holding and guiding gap 51.2 is achieved. The holding and guiding gap 51.2 is adapted to the mentioned bony prominence, namely in such a manner that poultry legs 9 of different sizes can be received in a sliding manner. A first gap edge 52.2 and a second gap edge 52.3 form reference holding edges.

The axial positioning apparatus 1.2 is an apparatus which is provided and configured along the holding and guiding gap 51.2 to be equipped with or for the attachment of processing tools and processing stations 56 at processing points. In the embodiment, the holding and guiding device 5.2 is equipped with two stationary lateral cutting stations 564, 565, a third stationary cutting station 566 and a fourth cutting station 567, as well as a pull-off station 569. In the drawing, the pull-off station is provided with the reference numeral 569 at only one point, at which the thigh meat 922 is pulled from the thigh bone 921.

The first stationary lateral cutting station 564 is formed by a first pair of first lateral cutting means 554 arranged offset along the conveying way 3.2. These cutting means apply first lateral cuts with a cutting depth to the cartilage of the bone on both lateral sides 950 of the poultry leg 9 at the height of the knee joint 93, beneath the holding and guiding gap 51.2. The lateral cutting means 554 are formed by circular knives which are each mounted on a pivot arm 544 to move against spring force.

The second stationary lateral cutting station 565 is a member of the pull-off station 569, which is configured for pulling the thigh meat 922 from the thigh bone 921 of the poultry leg 9. The second stationary lateral cutting station 565 has a second pair of second lateral cutting means 555 arranged offset along the conveying way 3.2, which cutting means apply second lateral cuts with a cutting depth to the thigh bone 921 on the lateral sides 950 of the poultry leg 9 below the knee joint 93, beneath the holding and guiding gap 51.2. The lateral cutting means 555 are formed by circular knives which are each mounted on a pivot arm 545 to move against spring force.

The pull-off station 569 has pull-off means 559, conveyed in a row beneath the holding and guiding gap 51.2, for pulling or scraping the thigh meat 922 from the thigh bone 921 of the poultry leg 9. Each pull-off means 559 co-runs with an associated carrier 21 in the direction of conveyance F. The pull-off means 559 are so configured that they push the thigh meat 922 on the thigh bone 921 to its proximal end, the hip joint bone 923.

As can be seen from FIG. 9, in the embodiment the stationary positioning element 6.2 and the co-running positioning element 7.2 are so configured that the positioning element 6.2 disengages completely from the poultry leg 9 in the suspension phase. At the end of the bending device 4.2, the stationary positioning element 6.2 terminates with the downwardly angled section 626, so that the poultry leg 9 is freed from the stationary positioning element 6.2 at the entry to the holding and guiding device 5.2.

Figure 10B:
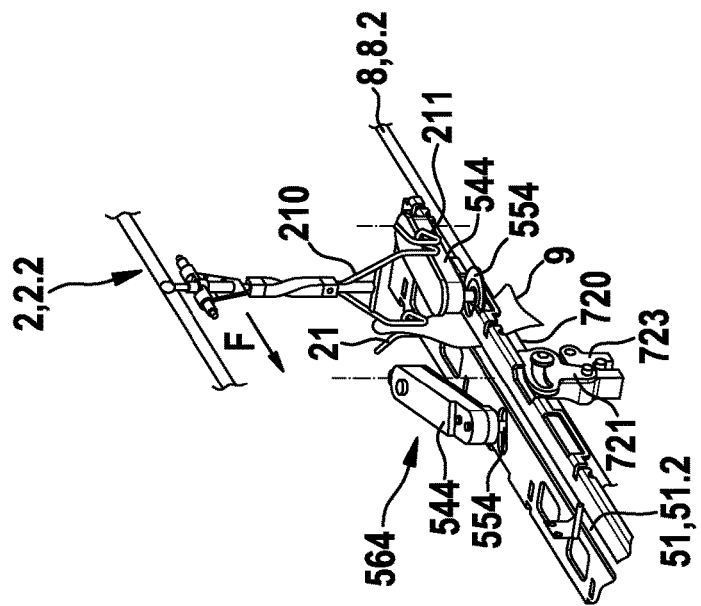
FIG. 10B shows an axonometric view of parts of the second positioning apparatus of FIG. 10A with conveyed poultry legs in the processing position according to the present invention.

As can be seen from FIG. 10, the co-running positioning element 7.2 is brought into a pivoted-back position again at the start of the conveying way 3.2 of the holding and guiding device 5.2. The position of the co-running positioning element 7.2 preceding the carrier 21 is eliminated, and the poultry leg 9 returns to a more or less upright position as a result of the elimination of the bend, the knee joint 93 being suspended in the holding and guiding gap 51.2. This has the result that the ankle joint ball 911 of the poultry leg 9 is lifted upwards in the carrier 21.

In the embodiment, the pivot arm 721 is pivoted into an intermediate position in which the co-running positioning element 7, 7.2 still performs a supporting and holding function on the rear side 942 of the leg below the hollow of the knee 95 in the region of the thigh 92, for transport in the direction of conveyance F. Moreover, conveying of the poultry leg 9 is continued with the carrier 21, parts of the carrier clamp 211 being in contact with the poultry leg 9. In this position of the poultry leg 9, the first lateral cuts are made by the lateral cutting station 564.

The drive and control device 8.1 is so configured and arranged that the supporting/holding contact of the positioning element 7, 7.2 is eliminated downstream of the lateral cutting station 564. The drive element 720 guided in a circular path is deflected at a point 726 transversely to the direction of conveyance F. As can be seen from FIG. 11, the positioning element 7, 7.2 is disengaged completely from the poultry leg 9 upstream of the deflection/discharge point by pivoting into a low position. Such a change of position of the positioning element 7, 7.2 can be provided at any desired point along the conveying section 32.2.

Figure 11B:
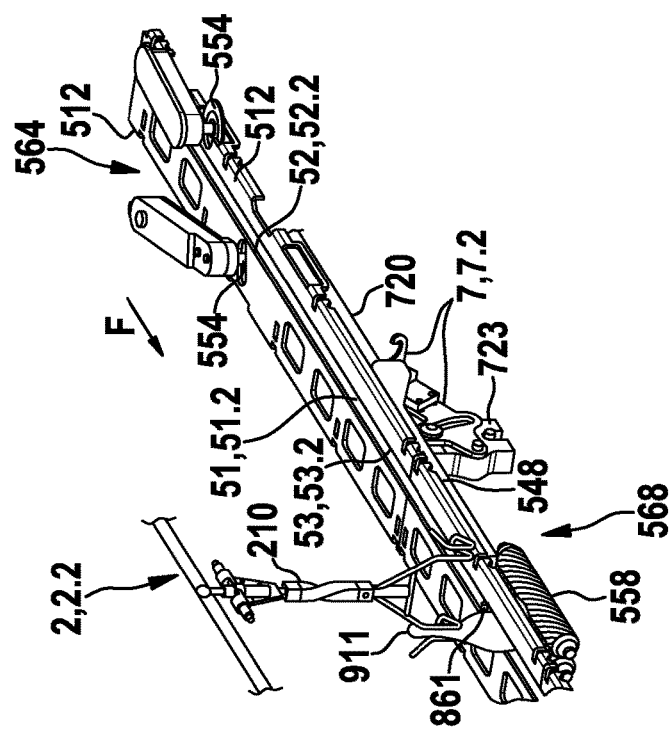
FIG. 11B shows an axonometric view of parts of the second positioning apparatus of FIG. 11A with conveyed poultry legs in the processing position according to the present invention.

As can be seen from FIGS. 6 and 11, a skinning station 568 can expediently also be arranged on the holding and guiding device 5.2. This station is advantageously arranged at the intermediate transport way between the first stationary lateral cutting station 564 and the second stationary lateral cutting station 565.

The skinning station 568 has a skinning means 558, namely, as is known per se, a pair of structured skinning rollers which are arranged in parallel in the direction of conveyance F. Between the two skinning rollers, each of which is provided with a spiral coil for removing the skin, an intake gap is formed. The thigh 92 of the poultry leg 9 comes to lie along the roller pair and on the roller pair centrally above the roller gap, on the front side 941 of the leg, in a bent position. The bent position is brought about by a horizontal ramp 548. The skinning station 568 can advantageously be configured with vertical adjustment, by which the skinning rollers can be brought into the skinning position, as required for skinning, and, if skinning is not to be carried out, into an inactive lowered position.

Figure 10A:
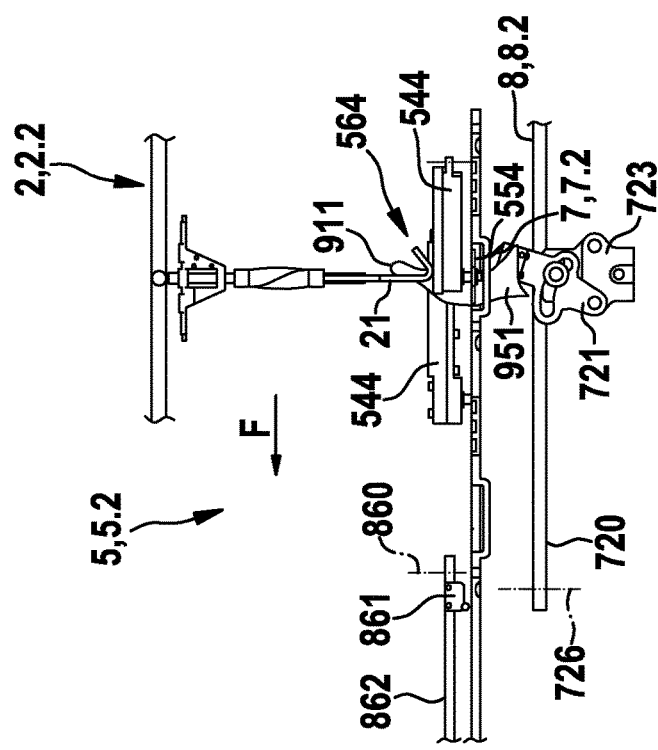
FIG. 10A shows a longitudinal view of parts of the second positioning apparatus with conveyed poultry legs in a processing position according to the present invention.
Figure 11A:
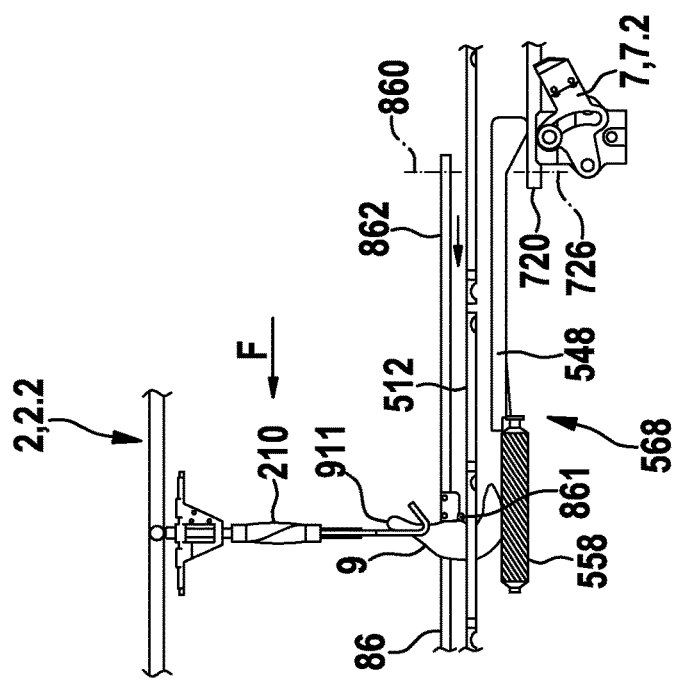
FIG. 11A shows a longitudinal view of parts of the second positioning apparatus with conveyed poultry legs in a processing position according to the present invention.

As is shown schematically only in FIG. 11A, a co-running support element 861 can advantageously be associated with each carrier 21 in the skinning section of the way. The support elements 861 are part of a drive and control device 86. Each co-running support element 861 is so arranged and guided that the co-running support element 861 is in contact upstream with the drumstick 91 of the poultry leg 9, above the holding and guiding gap. The support elements 861 are fixed to a revolving, driven strand 862. They enter the conveyor path at a deflection point 860 (FIG. 10A).

Figure 12B:
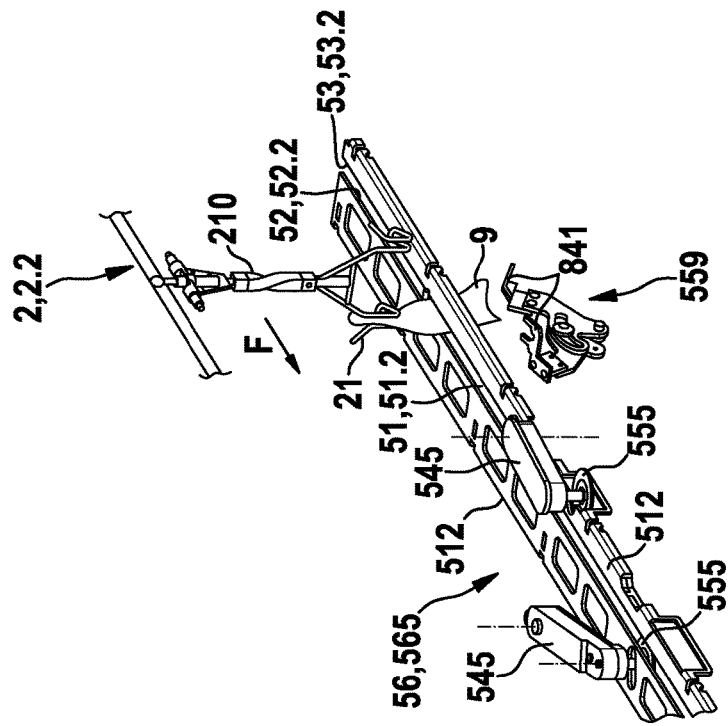
FIG. 12B shows an axonometric view of parts of the second positioning apparatus of FIG. 12A with conveyed poultry legs in the processing position according to the present invention.
Figure 12A:
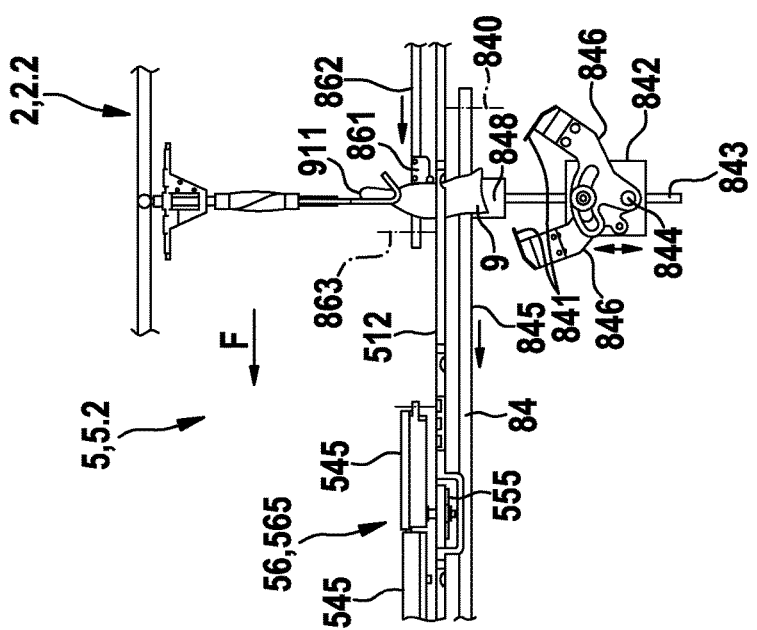
FIG. 12A shows a longitudinal view of parts of the second positioning apparatus with conveyed poultry legs in a processing position according to the present invention.

As is shown only in FIGS. 12A, 13A, 14A and 15A, the co-running pull-off means 559 in the embodiment is so configured, in conjunction with a drive and control device 84, that the co-running pull-off means reaches the thigh 92 close to the knee joint 93 before the second lateral cuts are applied. The pull-off means 559 is formed, for example, by two pull-off and gripping plates 841 having gripping recesses, each of which plates is fixed to an arm 846. The arms 846 are articulated in the manner of tongs, with articulation about a shaft 844, with an associated carriage 842, which is moved co-running with the associated carrier 21 by a drive means, for example a chain or similar strand, of the drive and control device 84. The carriage 842 is additionally mounted in a vertically adjustable manner on a guiding device 843, for example on a vertical rod, which is fixed to the drive means 845 by a carriage or a plate 848. The pull-off means 559 are fixed in a row to the drive means 845, which is guided in a revolving manner (endless), the pull-off means 559 entering the conveying path at a deflection point 840 (FIG. 12A). The gripping and pull-off plates 841 are moved and controlled in terms of location by control paths (not shown) of the drive and control device 84, which guide and move the carriage 842 and the arms 846 of the gripping and pull-off plates 841 in dependence on their position along the conveying path.

Figure 13B:
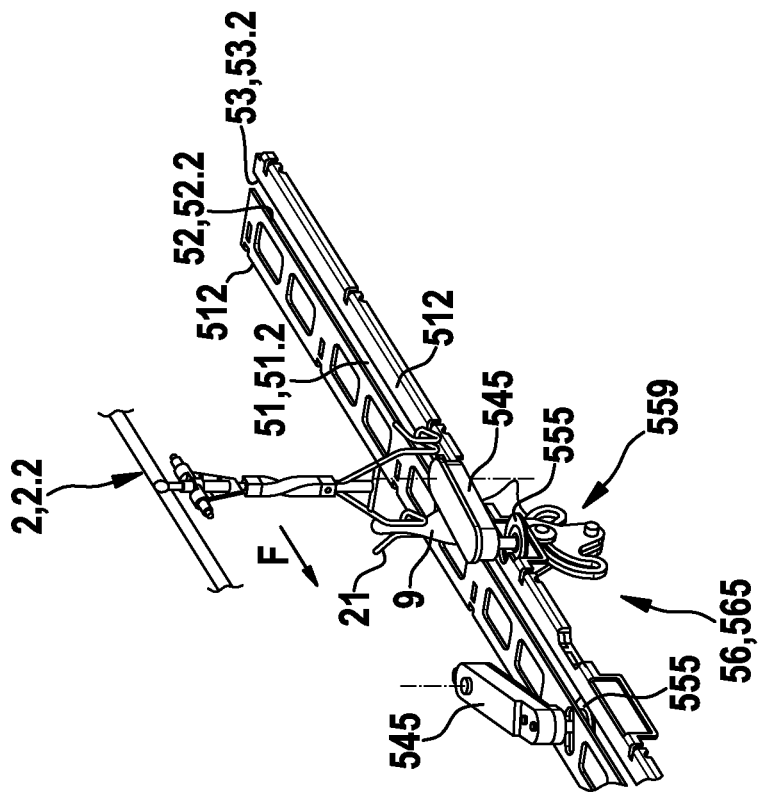
FIG. 13B shows an axonometric view of parts of the second positioning apparatus of FIG. 13A with conveyed poultry legs in the processing position according to the present invention.
Figure 13A:
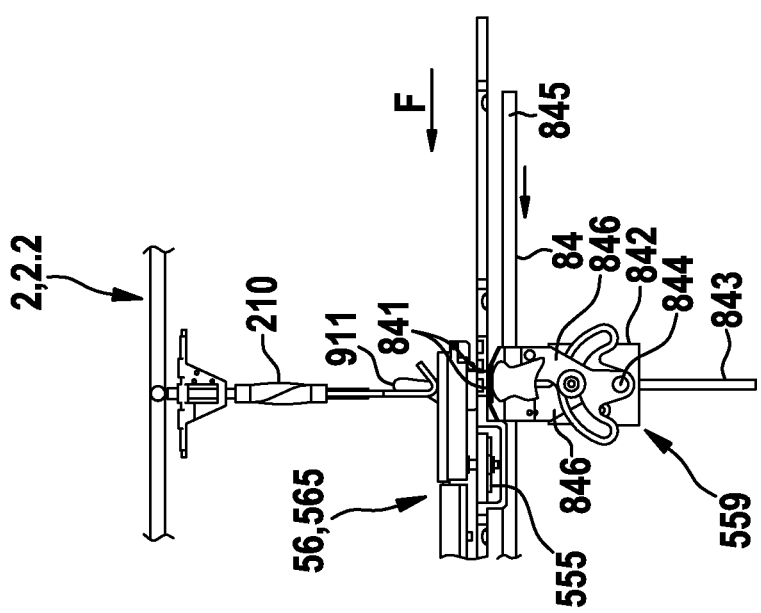
FIG. 13A shows a longitudinal view of parts of the second positioning apparatus with conveyed poultry legs in a processing position according to the present invention.

In a first control position, the two gripping and pull-off plates 841 are open in the manner of jaws (FIG. 12A). They are moved in the section before the lateral cutting station 565 to the height of the poultry leg knee joint 93, wherein the poultry leg 9 passes in the region of its thigh 92 close to the knee joint 93 between the two gripping and pull-off plates 841. As can be seen in FIG. 13, control is then such that the two gripping and pull-off plates 841 are brought into a closed position in which the poultry leg 9 is gripped in the manner of jaws by the two gripping recesses before the poultry leg 9 reaches the second lateral cutting station 565. The two gripping and pull-off plates 841 form in the closed position a co-running supporting and holding means. Control of the carriage 842 and the jaw arms 846 is such that the second lateral cuts are applied by the lateral cutting station 569 in the mentioned closed and local position.

Figure 14A:
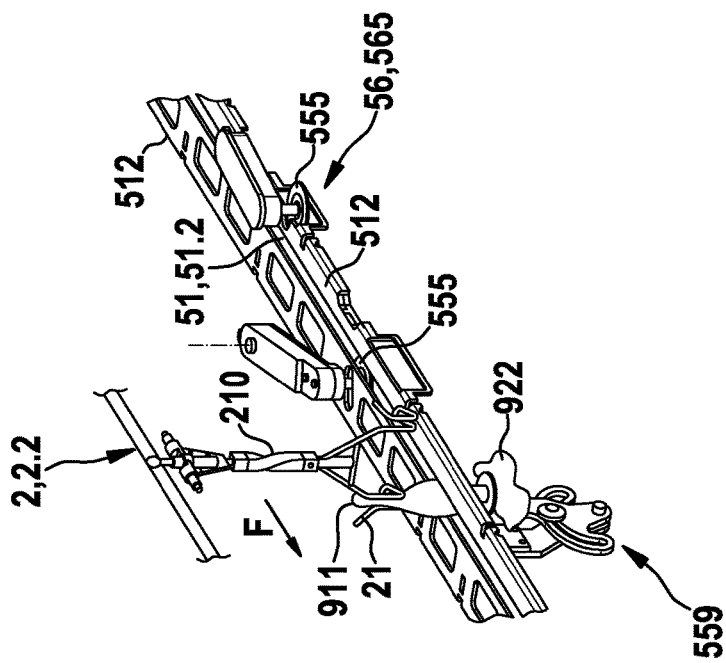
FIG. 14A shows a longitudinal view of parts of the second positioning apparatus with conveyed poultry legs in a processing position according to the present invention.
Figure 14B:
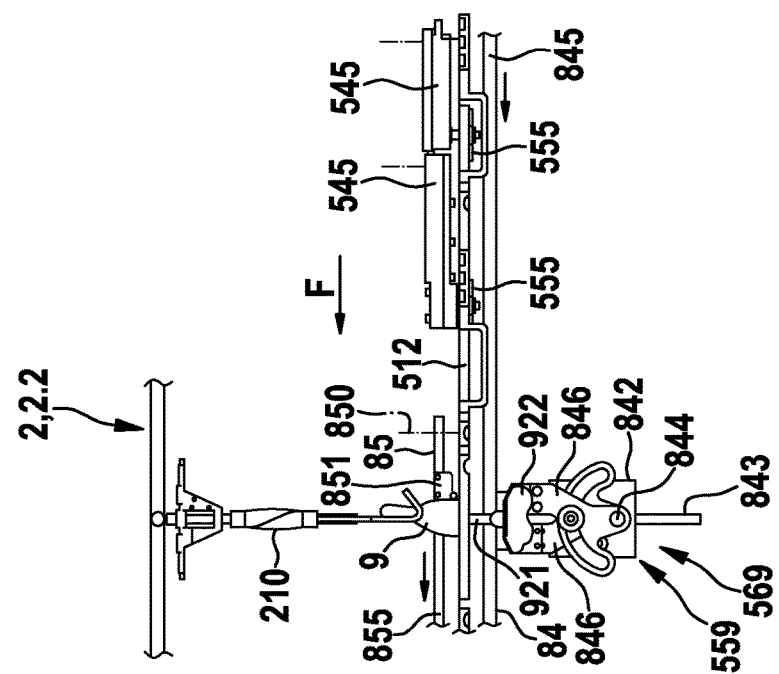
FIG. 14B shows an axonometric view of parts of the second positioning apparatus of FIG. 14A with conveyed poultry legs in the processing position according to the present invention.
Figure 15B:
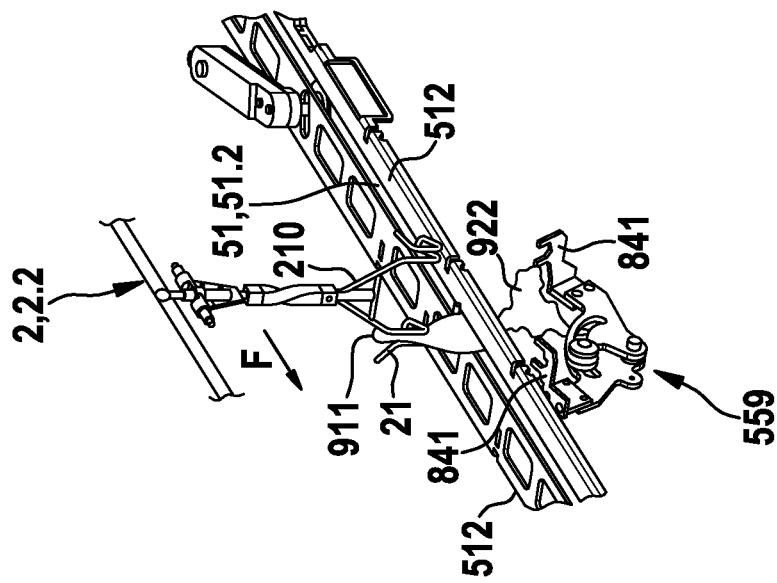
FIG. 15B shows an axonometric view of parts of the second positioning apparatus of FIG. 15A with conveyed poultry legs in the processing position according to the present invention.
Figure 15A:
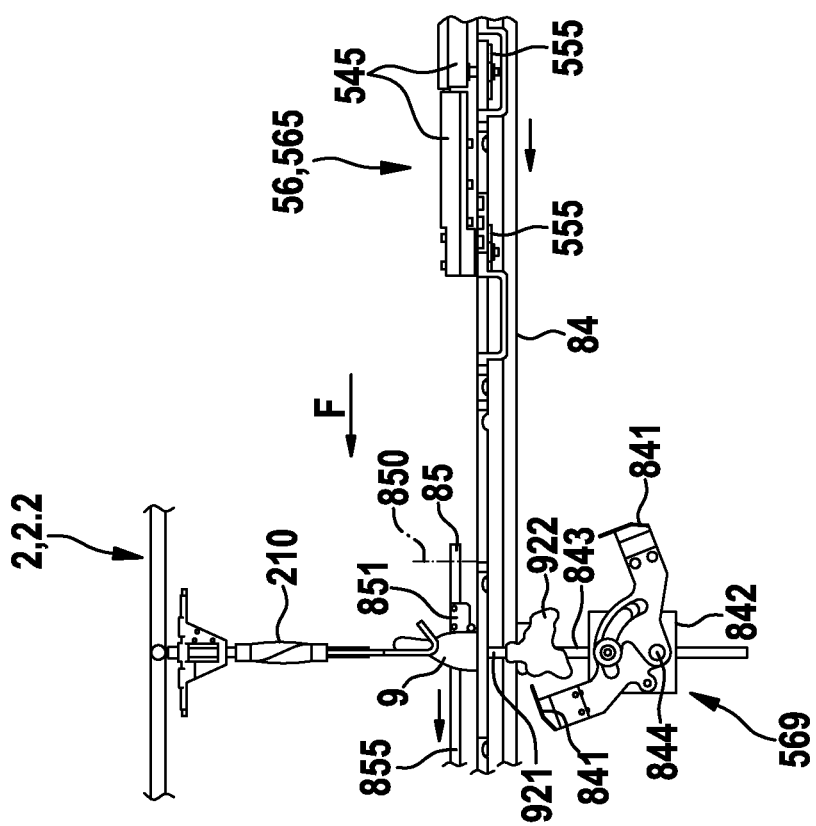
FIG. 15A shows a longitudinal view of parts of the second positioning apparatus with conveyed poultry legs in a processing position according to the present invention.

After the second lateral cuts have been made, the pull-off operation is carried out, as shown in FIGS. 14 and 15, the two gripping and pull-off plates 841 continuing to be held closed by the drive and control device 84 and, in the closed position, the carriage 842 being moved downwards by the guiding device 843 to the proximal end of the thigh 92. Control is so configured that the gripping and pull-off plates 841 are opened at the end of the pushing operation and are guided away from the poultry leg thigh 92 at a deflection point 847 and removed from the conveying path (FIG. 16A). In the phase in which the closed gripping and pull-off plates 841 push the thigh meat 922 to the proximal end of the thigh bone 921, the pull-off means 559 forms the local pull-off station 569, at which the thigh meat 922 which has been scraped off is obtained.

As shown in the embodiment in FIGS. 14A, 15A, 16A and 17A, there can expediently be provided a further drive and control device 85, which moves and guides co-running support elements 851 after (downstream of) the second lateral cutting station 565 to the end of the holding and guiding gap 51.2. Each co-running support element 851 is associated with a carrier 21 and so arranged and guided that the co-running support element 851 is in contact upstream with the drumstick 91 of the poultry leg 9 above the holding and guiding gap 51.2. The support elements 851 are fixed in a row arrangement to a revolving (endless) guided drive strand 855, for example a chain or the like. The support elements 851 enter the conveying path at a deflection point 850 and leave the conveying path at a deflection point 852.

Figure 16B:
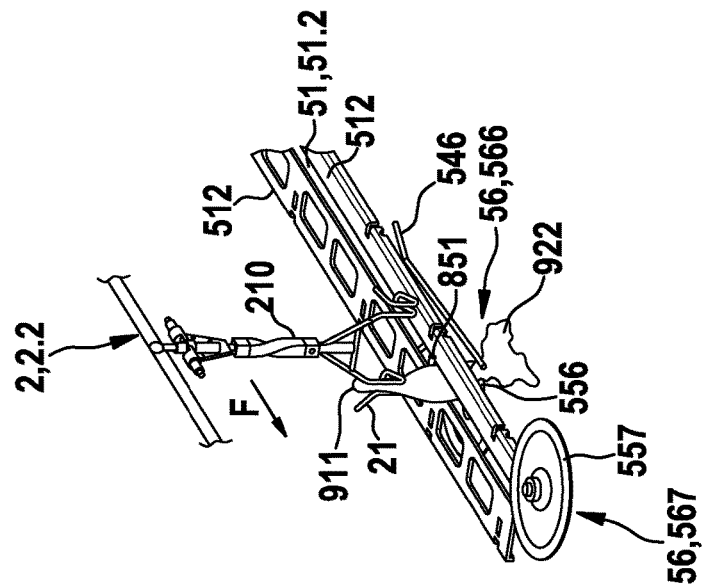
FIG. 16B shows an axonometric view of parts of the second positioning apparatus of FIG. 16A with conveyed poultry legs in the processing position according to the present invention.
Figure 16A:
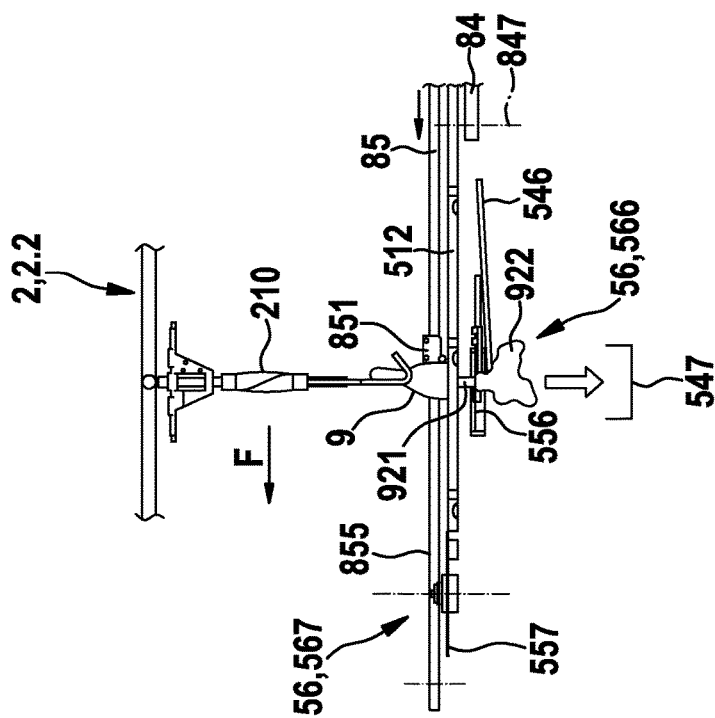
FIG. 16A shows a longitudinal view of parts of the second positioning apparatus with conveyed poultry legs in a processing position according to the present invention.

As can be seen from FIGS. 6, 16 and 17, the third stationary cutting station 566 having a cutting means 556 is associated with the pull-off station 569. The cutting means 556 is arranged at the height of the end of the thigh bone 921 from which thigh meat 922 has been pushed. By this configuration, the thigh meat 922 is removed from the end of the thigh bone 921, collected and discharged by a means 547.

Also visible in FIGS. 6, 16 and 17 is the fourth stationary cutting station 567 having a cutting means 557 which is arranged at the end of the holding and guiding gap 51.2 and separates the defleshed thigh bone 921 from the poultry leg drumstick 91 having drumstick meat by a cut made through the knee joint 93 on the front side 941 of the leg. The front cutting means 557 is arranged at the height of the holding and guiding gap 51.2.

In the embodiment, all the cutting means of the holding and guiding device 5.2 are formed by circular knives which are fixedly mounted on spring-loaded pivot arms. The pivot arms are articulated with a framework, a frame or the like of the holding and guiding device 5.2. The plane of each circular knife lies horizontally or slightly obliquely relative to the horizontal orientation, so that the cut is in each case applied and performed transversely to the axial orientation of the poultry leg 9 at the described points. Other cutting means which apply the desired cuts can be used.

FIG. 19 shows in the embodiment a positioning apparatus 10 which comprises the described lateral positioning apparatus 1.1 and the described axial positioning apparatus 1.2. The conveying way 30 of the positioning apparatus 10 is configured with a straight conveying line 200 throughout. The lateral positioning apparatus 1.1 is arranged upstream in a first conveying section 301 along the conveying way 3.1, and the axial positioning apparatus 1.2 is arranged downstream thereafter in a second conveying section 303 along the conveying way 3.2. Between the two positioning apparatuses 1.1 and 1.2, a rotary device 15 is arranged in a conveying section 302. The rotary device 15 is part of a complete conveying device which has the lateral conveying device 2.1 and the axial conveying device 2.2. As described, the lateral conveying device 2.1 and the axial conveying device 2.2 are equipped with double carriers 210, each of which has a pair of carriers 21 in which a left and a right poultry leg 9 are suspended by the ankle joint ball 911. In the rotary device 15, the carriers 21 are rotated out of the arrangement behind one another, which is configured for conveying the poultry legs 9 transversely, into the parallel arrangement for conveying the poultry legs 9 axially.

The method according to the invention will be described with reference to the use of the two positioning apparatuses 1.1 and 1.2 by way of example. By the positioning apparatus 10 formed by the two positioning apparatuses, the thighs 92 of the poultry legs 9 are deboned or filleted by defined lifting and holding of the knee joints 93 of the poultry legs 9. The processing operations described in connection with the positioning apparatuses 1.1 and 1.2 take place along the linear conveying way 30, the processing operations purposively being associated with the described processing points and being carried out in correspondence with one another.

The poultry legs 9 are conveyed through the two positioning apparatuses 1.1 and 1.2 in the direction of conveyance F in a straight line 200. In the conveying section 301 of the positioning apparatus 1.1, the poultry legs 9 are conveyed transversely with the lateral side 950 of the leg leading and, after rotation of each carrier 21 about a vertical axis, are then conveyed further in the conveying section 303 of the positioning apparatus 1.2, the poultry legs 9 being conveyed with the axial side 941 of the leg leading.

In the first conveying section 301, each poultry leg 9 conveyed transversely in a row is suspended by its knee joint 93 in the first stationary holding and guiding gap 51.1 and thereby lifted into a defined knee joint reference position for carrying out the described processing operations along the first processing conveying section 32.1 and moved in the direction of conveyance F, with the knee joint 93 resting in a sliding manner against the gap edges 52.1, 53.1, whereby the ankle joint ball 911 is held in a freely movable manner in the carrier 21 holding the ankle joint ball 911 for lifting of the poultry leg 9.

In the second conveying section 303, each poultry leg 9 conveyed axially in a row is suspended by its knee joint 93 in the second stationary holding and guiding gap 51.2 and thereby lifted into a defined knee joint reference position for carrying out the described processing operations along the second processing conveying section 32.2 and, while retaining the reference position, moved in the direction of conveyance F, with the knee joint resting in a sliding manner against the gap edges 52.2, 53.2, whereby the ankle joint ball 911 is held in a freely movable manner in the carrier 21 holding the ankle joint ball 911 for lifting of the poultry leg 9.

The method is generally determined by the described processing operations, or method measures, with the knee joint reference positioning at the first stationary holding and guiding gap 51.1 and the second stationary holding and guiding gap 51.2, without the form of the processing means being important. For carrying out the method, it is generally only important that each poultry leg 9 is introduced first by transverse conveying (lateral conveying) into a first holding and guiding gap 51 and then by axial conveying into a second stationary holding and guiding gap 51. For carrying out the method, insertion into the holding and guiding gaps 51 can be carried out in any suitable manner.

Particularly advantageously and expediently, each axially conveyed poultry leg 9 in the second conveying section 303 is bent and lifted in the direction of conveyance F along a bending conveying section 31.2, which is arranged before the stationary holding and guiding gap 51.2, for suspension of the poultry leg 9 in the stationary holding and guiding gap 51.2, wherein the bent position is determined by a bending angle 931 corresponding to the angle of the hollow of the knee between the thigh 92 and the drumstick 91, which bending angle becomes smaller during lifting. For carrying out these method steps, the measures for lifting and bending described with reference to the axial positioning apparatus 1.2 are advantageously carried out.

Advantageously and expediently, insertion of the initially transversely conveyed poultry legs 9 takes place in the conveying section 301 along a bending conveying section 31.1, which is arranged before the stationary holding and guiding gap 51.1. Each transversely conveyed poultry leg 9 is bent and lifted transversely to the direction of conveyance F for suspension in the first stationary holding and guiding gap 51.1, wherein the bent position is determined by a bending angle 931 corresponding to the angle of the hollow of the knee between the thigh 92 and the drumstick 91, which bending angle becomes smaller during lifting. For carrying out these method steps, the measures described for bending and lifting by the lateral positioning device 1.1 are advantageously provided.

In particular, at least one processing operation is carried out on the at least substantially unbent poultry leg 9 suspended in the associated holding and guiding gap 51.1 or 51.2. A bending position produced for threading is optionally eliminated.

It is also of particular importance according to the invention, independently of the other measures and per se, that the described method steps for deboning the poultry leg thigh 92 are carried out in the described sequence and in correspondence with one another. In this respect, it is important that a first front-side leg cut with a cutting depth to the cartilage is first applied on the front side 941 of the leg at the height of the knee joint 92, and then a rear-side leg cut with a cutting depth to the knee joint bone is applied on the rear side 942 of the leg at the height of the knee joint 93; further that a pair of first lateral cuts with a cutting depth to the cartilage of the bone are applied on the lateral sides 950 of the poultry leg 9 at the height of the knee joint 93, and then a pair of second lateral cuts with a cutting depth to the thigh bone 921 are applied on the lateral sides 950 of the poultry leg 9 below the knee joint 93; and that, after the cuts have been made, the thigh meat 922 is pushed onto the hip joint bone 923 at the proximal end of the thigh bone 921. Expediently, the thigh meat 922 which has been pushed onto the hip joint bone 923 is then removed. Further advantageously, the poultry leg 9 can be cut through in order to separate the defleshed thigh 92 from the drumstick 91.

Further advantageously, the second lateral cuts below the knee joint 93 are guided into the region of the front side 941 of the leg.

Following the first front-side cut, a second front-side cut can be made directly below the knee joint 93 with a cutting depth to the thigh bone, wherein the mentioned second lateral cuts are applied at the same cutting height on the poultry leg 9 as the second front-side cut. As in the embodiment according to FIGS. 1 to 5, the second front-side cut is advantageously omitted if the second lateral cuts are guided into the region on the front side 941 of the leg. If required, the second front-side cut, as shown schematically in FIG. 19, can be made by a second front-side cutting station 562 which is arranged between the stations 561 and 563 of the lateral positioning apparatus 1.1.

The invention claimed is:

1. A positioning apparatus configured for positioning poultry legs conveyed in a row in a direction of conveyance along a conveying way in a processing position which represents a reference position for processing the poultry legs, wherein the drumstick and thigh of the poultry legs are connected to one another by the knee joint and wherein one axial side of the leg, on which the patella is located, determines the front side of the leg and the other axial side of the leg, on which the hollow of the knee is located, determines the rear side of the leg, comprising a conveyor device having carriers which are movable along the conveying way in the direction of conveyance and which convey and hold the poultry legs, each with an ankle joint ball held in an associated mentioned carrier, along the entire conveying way of the positioning apparatus, wherein the carriers hold the poultry legs in a suspended position while they are fed into the positioning device, a bending device having a stationary positioning element extending in a bending conveying section of the conveying way, and a series of co-running positioning elements which each co-run in the direction of conveyance in association with an associated mentioned carrier, wherein a co-running positioning element forms with the stationary positioning element a pair of positioning elements, of which a first positioning element is configured to engage in the hollow of the knee of the poultry leg and a second positioning element is configured to rest against the thigh on the front side of the leg, and wherein in the bending conveying section of the conveying way the first positioning element and the second positioning element in the pair produce and determine between them a bending angle which corresponds to the angle of the hollow of the knee and which becomes smaller while lifting the poultry leg from the initial suspended position until the mentioned reference position is reached, and results in corresponding bent positions of the poultry leg, wherein the carriers of the conveyor device are so configured that the ankle joint ball in the carrier is able to move in a manner corresponding to the lifting of the poultry leg, and a reference holding edge extending in the conveying way, on which the poultry leg is held in a defined lifting position, namely in the reference position, in the region of the knee joint, characterized in that the positioning apparatus has a stationary holding and guiding device downstream of the bending conveying section in the direction of conveyance, which holding and guiding device holds each poultry leg in the reference position ready for processing as it is conveyed along a processing conveying section of the conveying way, wherein the holding and guiding device is equipped over the length of the processing conveying section with a stationary holding and guiding gap extending in the conveying way and having stationary gap edges which receive the poultry leg in the region of the knee joint for holding and guiding in the reference position, and wherein the mentioned reference holding edge forms at least in part a mentioned stationary gap edge, the bending conveying section along the conveying way and the processing conveying section along the conveying way are linear, and the mentioned bending device forms a threading device for threading the poultry leg in the region of the knee joint into the holding and guiding gap, wherein the co-running positioning elements are formed by driven pressing elements, and a drive and control device is provided which moves each driven pressing element in the direction of conveyance and, for bending, in two dimensions in the lifting direction and transversely thereto in a direction in which the driven pressing element grips the poultry leg from beneath on one of the mentioned axial sides of the leg for lifting and bending.

2. The apparatus according to claim 1, characterized in that the drive and control device of the co-running positioning elements is so configured that in at least one section of the processing conveying section of the holding and guiding gap, the engagement of the co-running positioning element in the poultry leg is at least reduced.

3. The apparatus according to claim 1, characterized in that the drive and control device of the co-running positioning elements generates at least a pivoting movement and at least a linear movement for moving each co-running positioning element, wherein the movements for moving the co-running positioning element are superimposed.

4. The apparatus according to claim 1, characterized in that at least two processing points are provided on the processing conveying section of the holding and guiding device, which processing points are arranged opposite one another on the conveying way.

5. The apparatus according to claim 4, characterized in that at least two of the mutually opposite processing points are offset along the conveying way.

6. The apparatus according to claim 1, characterized in that the positioning apparatus has in at least one part of the processing conveying section of the holding and guiding device first support elements which co-run with the carriers and come to rest against the poultry legs above the holding and guiding gap.

7. The apparatus according to claim 1, characterized in that the positioning apparatus has in at least one part of the processing conveying section of the holding and guiding device second support elements which co-run with the carriers and rest against the poultry legs below the holding and guiding gap.

8. The apparatus according to claim 1, characterized in that the conveyor device is so configured that in at least one part of the processing conveying section of the holding and guiding device, only the carriers form a means of moving the poultry legs along the holding and guiding gap.

9. The apparatus according to claim 1, characterized in that
the conveyor device is arranged and configured to form a conveyor device for axial conveying of the poultry legs, wherein the carriers are arranged to convey the poultry legs axially with the axial side of the leg, on which the patella is located, with the patella leading, namely in an axial plane common to the axes of the thigh bone and of the drumstick bone,
in each pair of positioning elements, the mentioned first positioning element, which is configured for engaging in the hollow of the knee of the poultry leg, is designed as the co-running positioning element of the series of co-running positioning elements, and the mentioned second positioning element, which is configured for resting against the thigh on the front side of the leg, is formed by the stationary positioning element, and
the stationary holding and guiding gap of the holding and guiding device is formed by a knee bone guiding gap having a gap width which is so adapted to bony prominences of the knee joint conveyed with the patella leading that the poultry leg is suspended in the knee bone gap at a defined point of the knee joint bony prominences by those bony prominences and guided in the direction of conveyance in a sliding manner on the gap edges of the knee bone gap,
wherein the positioning elements which cooperate as a pair during bending and lifting are configured for threading and suspending the poultry leg in the knee bone guiding gap with the patella leading.

10. The apparatus according to claim 9, characterized in that the stationary positioning element is so arranged and configured that, at the beginning of the knee bone guiding gap, the stationary positioning element ceases to rest against the thigh of the poultry leg.

11. The apparatus according to claim 9, characterized in that the stationary positioning element is formed by a stationary ramp of the threading device having a ramp guide which is oriented upwards in the direction of conveyance at least in part, so that the thigh on the front side of the poultry leg runs onto a low guiding section of the ramp and leaves the ramp via a more highly situated guiding section.

12. The apparatus according to claim 11, characterized in that the ramp guide is divided in the direction of conveyance into at least two guiding sections which bend the poultry leg, wherein an upper guiding section, which is situated closest to the holding and guiding device, is flat.

13. The apparatus according to claim 9, characterized in that each co-running positioning element is formed by a knee hollow pushing element which engages in the hollow of the knee, wherein the drive and control device is so configured that, after the poultry leg has entered the positioning apparatus, the knee hollow pushing element is pushed into the hollow of the knee of the poultry leg and then, in accordance with the movement of the poultry leg effected by the stationary positioning element, is so moved and guided, with continued engagement in the hollow of the knee, that, during pushing and increasing bending of the poultry leg, the knee hollow pushing element precedes the carrier on which the poultry leg is suspended.

14. The apparatus according to claim 13, characterized in that the drive and control device is so configured that the knee hollow pushing element, upon entry of the poultry leg into the positioning apparatus, moves from a position below the hollow of the knee of the poultry leg into the hollow of the knee.

15. The apparatus according to claim 13, characterized in that the drive and control device is so configured that the knee hollow pushing element comes to lie in the region of the holding and guiding device below the knee bone guiding gap, where it remains, against the direction of conveyance, to such an extent that the bent position of the poultry leg effected by the knee hollow pushing element is reduced or eliminated.

16. The apparatus according to claim 9, characterized in that the positioning apparatus has at least one stationary bracing positioning element which engages the front side of the leg together with the second, namely the stationary, positioning element.

17. The apparatus according to claim 9, characterized in that a first stationary lateral cutting station is arranged on the processing conveying section of the holding and guiding device, which cutting station is formed by a first pair of first lateral cutting means which are arranged offset along the conveying way and which, below the holding and guiding gap, apply first lateral cuts on both lateral sides of the poultry leg at the height of the knee joint with a cutting depth to the cartilage of the bone.

18. The apparatus according to claim 17, characterized in that a pull-off station for pulling the thigh meat from the thigh bone is arranged on the processing conveying section of the holding and guiding device, following the first lateral cutting station, wherein the pull-off station comprises a second stationary lateral cutting station having a second pair of second lateral cutting means arranged offset along the conveying way and pull-off means co-running in the direction of conveyance for pulling the thigh meat from the thigh bone of the poultry leg, wherein the second lateral cutting means, beneath the holding and guiding gap, apply second lateral cuts below the knee joint on both lateral sides of the poultry leg with a cutting depth to the thigh bone, and each pull-off means pushes the thigh meat to the proximal end of the thigh bone.

19. The apparatus according to claim 18, characterized in that the pull-off station is so configured that the co-running pull-off means forms a support and holding means which comes to rest against the thigh close to the knee joint before the second lateral cuts are applied.

20. The apparatus according to claim 18, characterized in that downstream of the pull-off station there is a third stationary cutting station having cutting means, which separates the thigh meat at the proximal end of the thigh bone from the thigh bone.

21. The apparatus according to claim 20, characterized in that there is provided a fourth stationary cutting station having cutting means, which separates the drumstick, which bears the drumstick meat, of the poultry leg from the defleshed thigh bone with a cut through the knee joint.

22. The apparatus according to claim 1, characterized in that
the conveyor device is arranged and configured to form a conveyor device for lateral conveying of the poultry legs, wherein the carriers are arranged to convey the poultry legs transversely, with one of the two lateral sides of the leg leading,
the mentioned first positioning element, which is configured to engage in the hollow of the knee, is the stationary positioning element, which is formed by a positioning edge,
the mentioned second positioning element, which is configured to rest against the thigh on the front side of the leg, is configured as the co-running positioning element of the series of co-running positioning elements which cooperates with the stationary positioning element in a pair,
the stationary holding and guiding gap of the holding and guiding device is formed by a knee bone guiding gap having a gap width which is so adapted to knee bony prominences of the knee joint of the transversely conveyed poultry leg that the transversely conveyed poultry leg is suspended in the knee bone guiding gap at a defined point of the knee joint bony prominences by those bony prominences and guided in the direction of conveyance in a sliding manner on the gap edges of the knee bone guiding gap,
wherein the positioning elements which cooperate in a pair during bending and lifting are configured for threading and suspending the transversely conveyed poultry leg in the knee bone guiding gap,
wherein the mentioned reference holding edge is divided along the conveying way of the positioning apparatus into two reference holding edge sections, namely into a first reference holding edge section, which is part of the mentioned bending conveying section and forms the stationary positioning edge thereof, and a subsequent second reference holding edge section, which forms one gap edge of the knee bone guiding gap of the holding and guiding device.

23. The apparatus according to claim 22, characterized in that the drive and control device of the co-running positioning element is so configured that the co-running positioning element disengages from the poultry leg in at least one section of the processing conveying section of the holding and guiding device.

24. The apparatus according to claim 22, characterized in that the lateral positioning apparatus is equipped with lateral pushing elements co-running in the direction of conveyance, which lateral pushing elements are associated with the co-running positioning elements and are so configured that the co-running positioning element and the co-running lateral pushing element, in each case in a pair, form a co-running pressing and support mounting, wherein the co-running pushing element engages the lateral side of the leg that is situated upstream in the direction of conveyance by pushing contact in the region of the thigh of the poultry leg, and the co-running positioning element performs the movements for lifting and increasingly bending the poultry leg, transversely to the direction of conveyance.

25. The apparatus according to claim 24, characterized in that the lateral positioning apparatus is so configured that the co-running lateral pushing element maintains pushing contact with the mentioned lateral side of the poultry leg at least along a part-section of the holding and guiding gap.

26. The apparatus according to claim 22, characterized in that the co-running positioning element is in the form of an arm-like element having two arm sections, namely having a first arm section, which substantially engages the front side of the leg with movement transversely to the direction of conveyance, and a second arm section, which substantially rests against the thigh on the lateral side of the leg that is situated downstream in the direction of conveyance in order to support it.

27. The apparatus according to claim 22, characterized in that the positioning apparatus has a stationary initial positioning guide extending in an initial section of the conveying way, which initial positioning guide is associated with the co-running positioning element, against which the front side of the leg abuts in the region of the thigh and which guides the poultry leg transversely to the direction of conveyance against the stationary positioning element before the co-running positioning element comes to rest against the poultry leg.

28. The apparatus according to claim 22, characterized in that the stationary positioning element is formed along an entry-side part of the bending conveying section of the positioning apparatus having an edge of wedge-shaped cross-section, the cross-section of which is adapted to a hollow between the drumstick and the thigh that is present when the poultry leg enters the positioning apparatus.

29. The apparatus according to claim 22, characterized in that the carriers are in the form of rotary carriers, which are rotatable about a vertical axis into a position in which the poultry legs are located with the patella leading for further conveying.

30. The apparatus according to claim 22, characterized in that a first stationary front-side cutting station is arranged on the processing conveying section of the holding and guiding device, which cutting station has a cutting means operating above the holding and guiding gap which applies a cut on the front side of the leg at the height of the knee joint with a cutting depth to the cartilage.

31. The apparatus according to claim 30, characterized in that the first front-side cutting station is arranged in an entry-side conveying section part of the holding and guiding device, in which the co-running positioning element is in a pressing position for bending the poultry leg.

32. The apparatus according to claim 30, characterized in that a second stationary front-side cutting station is arranged on the processing conveying section of the holding and guiding device, which cutting station has a cutting means operating below the holding and guiding gap which applies a cut on the front side of the leg directly below the knee joint with a cutting depth to the thigh bone.

33. The apparatus according to claim 30, characterized in that a stationary rear-side cutting station is arranged on the processing conveying section of the holding and guiding device, which cutting station has a cutting means operating above the holding and guiding gap which applies a cut on the rear side of the leg at the height of the knee joint with a cutting depth to the knee joint bone.

34. The apparatus according to claim 33, characterized in that the rear-side cutting station is arranged in an exit-side conveying section of the holding and guiding device, in which the co-running positioning element is disengaged from the poultry leg in order to eliminate the bent position of the poultry leg.

35. A positioning system comprising:
a first positioning apparatus, being a lateral positioning apparatus comprising the conveyor device for lateral conveying of the poultry legs according to claim 22,
a subsequent second positioning apparatus, being an axial positioning apparatus comprising a conveyor device for axial conveying of the poultry legs, and
a rotary station positioned between the first positioning apparatus and the second positioning apparatus,
wherein the first positioning apparatus and the second positioning apparatus are arranged along a conveying way, and
wherein the rotary station is configured with rotatable carriers which form the carriers which convey the poultry legs along the conveying ways of the two positioning apparatuses, wherein the carriers are rotatable from the position of lateral conveying into the position of axial conveying.

36. A method for removing, during conveying, the thigh meat from poultry legs conveyed in a row in the direction of conveyance, the drumsticks and thighs of said legs being connected to one another by the knee joint and the legs being in a suspended arrangement with the ankle joint balls held in a carrying device, wherein the poultry leg is positioned by defined lifting and holding of the knee joint, cuts are applied in the poultry leg meat in the region of the knee of the poultry leg with a cutting depth down to the bone, and the thigh meat is pushed from the specifically positioned knee joint to the hip joint bone, characterized in that
the poultry legs are conveyed in a linear direction of conveyance while all manipulations for positioning and processing are performed automatically, wherein the poultry legs are conveyed by carriers which can be moved along a linear conveying way and in which the poultry legs, each associated with a carrier, are held by the ankle joint ball during the entire conveying operation,
the poultry legs are conveyed by a linear conveying way in two conveying sections, namely in a first conveying section in which the poultry legs are conveyed transversely with the lateral side of the leg leading and, after rotation of each carrier about a vertical axis, in a second conveying section in which the poultry legs are conveyed axially with the axial side of the leg, on which the patella is located, leading, namely in an axial plane common to the axes of the thigh bone and of the drumstick bone, with the patella leading,
in the first conveying section, the transversely conveyed poultry legs are introduced into a first stationary holding and guiding gap which extends linearly in the direction of conveyance and has first stationary gap edges, wherein the transversely conveyed poultry leg is suspended in the first stationary holding and guiding gap at a defined position of a knee joint bony prominence by that bony prominence and thereby lifted into a defined reference position for the performance of processing operations along a first gap conveying way of the first holding and guiding gap and is moved in the direction of conveyance by sliding at the height of the knee joint on the gap edges, wherein the ankle joint ball, for lifting the poultry leg, is held in a movable manner in the carrier holding it,
in the first gap conveying way of the first stationary holding and guiding gap, a first front-side leg cut is applied on the front side of the leg at the height of the knee joint with a cutting depth to the cartilage, and a rear-side leg cut is applied on the rear side of the leg at the height of the knee joint with a cutting depth to the knee joint bone,
in the second conveying section, the poultry legs conveyed axially therein are introduced into a second stationary holding and guiding gap which extends linearly in the direction of conveyance and has second stationary gap edges, wherein the axially conveyed poultry leg is suspended in the second stationary holding and guiding gap at a defined point of a knee joint bony prominence by that bony prominence and thereby lifted into a defined reference position for the performance of processing operations along the second gap conveying way of the second holding and guiding gap and is moved in the direction of conveyance by sliding at the height of the knee joint on the gap edges, wherein the ankle joint ball, for lifting the poultry leg, is held in a movable manner in the carrier holding it, and
in the second gap conveying way of the second stationary holding and guiding gap, a pair of first lateral cuts are applied on the lateral sides of the poultry leg at the height of the knee joint with a cutting depth to the cartilage of the bone, and then a pair of second lateral cuts are applied on the lateral sides of the poultry leg below the knee joint with a cutting depth to the thigh bone, and the thigh meat is pushed onto the hip joint bone at the proximal end of the thigh bone.

37. The method according to claim 36, characterized in that, on the second gap conveying way belonging to the second holding and guiding gap, lateral cuts of at least one mentioned pair are made opposite the gap conveying way and offset along it.

38. The method according to claim 36, characterized in that, on the second gap conveying way, the second lateral cuts are guided below the knee joint into the region on the front side of the leg.

39. The method according to claim 36, characterized in that, on the first gap conveying way, a second front-side cut is made directly below the knee joint with a cutting depth to the thigh bone, wherein on the second gap conveying way, the second lateral cuts are applied at the same cutting height on the poultry leg as the second front-side cut on the first gap conveying way.

40. The method according to claim 36, characterized in that, in the second conveying section, the thigh meat pushed onto the hip joint bone is removed.

41. The method according to claim 36, characterized in that at the end of the second conveying section, the poultry leg is cut through in order to separate the drumstick from the defleshed thigh.

42. The method according to claim 36, characterized in that each poultry leg conveyed axially in the second conveying section is bent and lifted in the direction of conveyance along a second bending conveying section, which is upstream of the second stationary holding and guiding gap, for suspension of the poultry leg in the second stationary holding and guiding gap, wherein the bent positions are determined by a bending angle corresponding to the angle of the hollow of the knee between the thigh and drumstick, which bending angle becomes smaller during the lifting.

43. The method according to claim 42, wherein, in order to carry out the method, a positioning apparatus is used in the second conveying section for the conveying, positioning and processing established thereby.

44. The method according to claim 36, characterized in that each transversely conveyed poultry leg in the first conveying section is bent and lifted transversely to the direction of conveyance along a first bending conveying section, which is upstream of the first stationary holding and guiding gap, for suspension in the first stationary holding and guiding gap, wherein the bent positions are determined by a bending angle corresponding to the angle of the hollow of the knee between the thigh and the drumstick, which bending angle becomes smaller during the lifting.

45. The method according to claim 44, wherein, in order to carry out the method, a positioning apparatus is used in the first conveying section for the conveying, positioning and processing established thereby.

46. The method according to claim 36, characterized in that at least in a section of a mentioned holding and guiding gap, processing is carried out on the substantially unbent poultry leg suspended in the associated holding and guiding gap.

* * * * *